(12) United States Patent
Anderson et al.

(10) Patent No.: US 11,664,653 B2
(45) Date of Patent: May 30, 2023

(54) OVERVOLTAGE PROTECTION ASSEMBLY

(71) Applicant: TechHold, LLC, Minneapolis, MN (US)

(72) Inventors: George Anderson, Champlin, MN (US); Greg Fuchs, River Falls, WI (US); David Anderson, Excelsior, MN (US)

(73) Assignee: TechHold, LLC, Minneapolis, MN (US)

( * ) Notice: Subject to any disclaimer, the term of this patent is extended or adjusted under 35 U.S.C. 154(b) by 0 days.

(21) Appl. No.: 17/326,988

(22) Filed: May 21, 2021

(65) Prior Publication Data

US 2021/0367418 A1 Nov. 25, 2021

Related U.S. Application Data

(60) Provisional application No. 63/029,171, filed on May 22, 2020.

(51) Int. Cl.
| | |
|---|---|
| *H02H 7/20* | (2006.01) |
| *H02H 7/04* | (2006.01) |
| *H02H 3/04* | (2006.01) |
| *H02H 3/08* | (2006.01) |
| *H02H 3/20* | (2006.01) |

(52) U.S. Cl.
CPC ............ *H02H 7/04* (2013.01); *H02H 3/04* (2013.01); *H02H 3/08* (2013.01); *H02H 3/20* (2013.01)

(58) Field of Classification Search
CPC .. H02H 7/04; H02H 3/04; H02H 3/20; H02H 3/08; H01T 4/10; H01T 4/14
USPC ....................................................... 361/112
See application file for complete search history.

(56) References Cited

U.S. PATENT DOCUMENTS

| | | |
|---|---|---|
| 1,477,303 A | 12/1923 | Allcutt |
| 2,282,905 A | 5/1942 | Towne |
| 3,715,614 A | 2/1973 | Linkroum |

(Continued)

FOREIGN PATENT DOCUMENTS

| | | |
|---|---|---|
| DE | 27 18 188 A1 | 10/1978 |
| DE | 39 10 435 A1 | 8/1990 |

(Continued)

OTHER PUBLICATIONS

International Search Report and Written Opinion for PCT/US2014/017161 dated May 14, 2014.

(Continued)

*Primary Examiner* — Jared Fureman
*Assistant Examiner* — Lucy M Thomas
(74) *Attorney, Agent, or Firm* — Merchant & Gould P.C.

(57) ABSTRACT

The present disclosure relates generally to an overvoltage protection assembly, and an electrode useable in pairs in such an overvoltage protection device. In various aspects, at least one electrode is made from a single piece of conductive source material to ensure its strength, reliability, and ease of manufacture. Still further, the electrode has a specific geometry selected to enhance electromagnetic effects experienced during high voltage, high current overvoltage events in a way that quickly relocates and dissipates an arc formed at a gap between an electrode pair, to ensure repeatable, reliable performance of the overvoltage protection device.

21 Claims, 21 Drawing Sheets

(56) References Cited

U.S. PATENT DOCUMENTS

| | | | |
|---|---|---|---|
| 4,037,266 A | * | 7/1977 | English .................. H01T 1/22 |
| | | | 313/631 |
| 4,267,484 A | | 5/1981 | O'Loughlin |
| 4,665,460 A | | 5/1987 | Schaff |
| 5,417,385 A | | 5/1995 | Arnold et al. |
| 6,084,759 A | * | 7/2000 | Hansson ............... H05K 1/026 |
| | | | 361/301.2 |
| 6,384,374 B1 | | 5/2002 | Colling et al. |
| 8,878,396 B2 | | 11/2014 | Faxvog et al. |
| 9,660,441 B2 | | 5/2017 | Fuchs et al. |
| 11,038,347 B2 | | 6/2021 | Fuchs et al. |
| 2002/0149898 A1 | | 10/2002 | Durth et al. |
| 2003/0030957 A1 | | 2/2003 | Schmidt et al. |
| 2005/0068709 A1 | | 3/2005 | Kouwenhoven et al. |
| 2007/0058319 A1 | | 3/2007 | Frescaline et al. |
| 2011/0101989 A1 | | 5/2011 | Hyde et al. |
| 2011/0102960 A1 | | 5/2011 | Podporkin |
| 2012/0019962 A1 | | 1/2012 | Faxvog et al. |
| 2013/0038977 A1 | | 2/2013 | Lange et al. |
| 2014/0334054 A1 | | 11/2014 | Fuchs et al. |
| 2015/0311697 A1 | | 10/2015 | Faxvog et al. |
| 2017/0222433 A1 | | 8/2017 | Fuchs et al. |
| 2020/0106262 A1 | | 4/2020 | Anderson et al. |

FOREIGN PATENT DOCUMENTS

| | | |
|---|---|---|
| DE | 102 45 144 B3 | 1/2004 |
| DE | 10 2007 015 930 A1 | 7/2008 |
| GB | 14482 | 10/1916 |
| JP | 55-32655 | 3/1980 |
| JP | 59-221920 A | 12/1984 |
| JP | 5-36323 | 2/1993 |
| JP | 2009-219304 A | 9/2009 |
| JP | 2012-204055 A | 10/2012 |
| WO | 2009/145249 A1 | 12/2009 |

OTHER PUBLICATIONS

Redlund, J. et al., "A New Fast Protective Device for High Voltage Series Capacitors," IEEE Power Engineering Society General Meeting, Montreal, Quebec, pp. 1-7 (2006).

International Search Report and Written Opinion for Application No. PCT/US2021/033704 dated Sep. 9, 2021.

* cited by examiner

OVERVOLTAGE PROTECTION ASSEMBLY

CROSS-REFERENCE TO RELATED APPLICATIONS

The present application claims priority from U.S. Provisional Patent Application No. 63/029,171, filed on May 22, 2020, the disclosure of which is hereby incorporated by reference in its entirety.

BACKGROUND

Traditionally, critical electrical systems may be required to be protected against overvoltages caused by undesirable and often unplanned events (hereafter and where appropriate called faults) in such electrical systems. This protection may be required when such faults can generate much higher than normal currents through or voltages across critical devices such that they may exceed their safe rated limits. For example, elements of the large bulk power systems (hereafter called the grid), which provide commercial and residential electric power to wide geographic areas, are examples of critical infrastructure. When current flows in elements of the grid, the current flows through resistances and that produces a voltage differential. Excess voltages may be introduced, for example by a lightning strike on a conductor within the system. Another example may be when a large high voltage transmission line contacts the ground, this may produce what is called a ground fault. This can cause a major imbalance in transformers in the system, and can cause unusually high current in the neutral wires of the system, and this may also cause unexpected high voltages at various points. In many such events, if the unexpected voltage across any element of the system exceeds the insulation capability or voltage standoff rating of that device, there may be arcs and excessive current flows which damage insulation, major conductors and other elements of the critical infrastructure.

Systems have historically been developed that protect such large scale equipment during fault events. In some systems, surge arresters have been placed on power transmission lines connected to power line transformers to protect them during lightning strikes, ground faults, or other high voltage and/or current spike conditions. In such circumstances, surge arresters allow current flow to ground or another safe location when a set voltage is exceeded, so as to limit that voltage to a relatively safe maximum, before it can damage the systems being protected. However, common surge arresters have a limit to the amount of energy they can shunt to ground. If the overvoltage event continues after that energy limit is exceeded, the surge arrester enters a pressure relief mode. In this event, the surge arrester is designed to safely carry the current to ground and to limit the voltage on the protected system (e.g. as described in IEEE C62.11); however, after a pressure relief event, the surge arrester will continue to conduct that current at far lower voltages and will have to be replaced for the system to function properly afterwards. It is important that protective devices allow normal system operation by not limiting system voltages to too low a level for delivering power, and also that they do not fail to limit voltages which are too high and may damage the system. It is therefore advantageous if the protective device be capable of multiple protective actions of varying severity without a large change up or down from the appropriate set point voltage of the device when it is new.

In some older existing systems, a spark gap has been used to allow relief of overvoltage events by allowing a spark (hereafter and where appropriate called an arc) to form across a gap between electrode surfaces. Such a gap may be formed in open air, or may alternatively be in a non-combustible and chemically stable gas environment provided within a container. Such a gap can be used to cause relief of voltage events that exceed a predetermined voltage threshold, often called the set point. Typically, the voltage set point is specified to be safely below the rated capability of the insulation on devices electrically connected in that system, such that excess voltages will always be reduced and held below a safe level (a level at which damage to those devices may occur). The effect is to put a sufficiently precise limit on the voltage of the system. Below that voltage set point, little or no current will flow through the spark gap, and above that voltage set point any amount of current up to the rated maximum current, voltage and arc duration time of the specific spark gap design will flow in an arc across the gap. When the voltage drops sufficiently, the arc will dissipate and once again no current will flow.

In the context of use with commercial and residential electric power systems, it may be that a certain voltage range (e.g., between about 2 kV and about 28 kV) represents a desirable set point. In this context, a gap distance used in such an open air gap may be in the range of only a few millimeters, as discussed in U.S. Pat. No. 9,660,441, entitled "Overvoltage Protection for Power Systems", the disclosure of which is hereby incorporated by reference in its entirety. However, in such arrangements, because the gap distance is so narrow to achieve the desired set point, high-current events that cause the ablation and other damage described above, which may typically only cause a small variation in gap distance, in fact reflect a large percentage change in the set point. This is because changes in distance proportionally affect the set point. Accordingly, particularly at such voltage ranges, reliable operation may be compromised by damage to electrodes that causes change to the set point.

For at least some of the reasons above, spark gap devices historically have been disfavored due, at least in part, to their inability to handle more than one event without the breakdown voltage (set point) changing with each protective action—increasing as the gap distance increases. However, other types of devices, such as surge arresters, may not always be suitable for use at desired voltage levels (e.g., from about 2 kV up to and exceeding 28 kV) and current levels (in the 1-35 kiloamp range) for prolonged periods.

The construction of a spark gap device capable of withstanding significant current for multiple, long duration events requiring a narrow gap distance without increase the voltage set points can be difficult, due to the robust support structures required and narrow gap distance which must be maintained for multiple events without damaging ablation from the arc plasma. Accordingly, improvements in existing devices useable in such contexts is desirable.

SUMMARY

The present disclosure relates generally to an overvoltage protection device, and an electrode pairing in such an overvoltage protection device. In some aspects, the electrode is made from a single piece of conductive source material to ensure its strength and reliability. Still further, in some aspects the electrode has a specific geometry selected to counterintuitively enhance potentially damaging electromagnetic effects experienced during high current events on the arc which quickly relocate and dissipate an arc formed at a gap between an electrode pair. The geometry of the electrodes may be identical or different but complementary so as to utilize the same electromagnetic principles.

In a first aspect, an overvoltage protection assembly includes at least one overvoltage protection subassembly. The overvoltage protection subassembly includes a first electrode and a second electrode positioned opposed to the first electrode, the first electrode comprising a unitary conductive element. The first electrode includes a base portion at a first end; an electrode tip portion at a second end opposite the base portion, the electrode tip portion having an angled surface formed in the unitary conductive element, and a gap forming portion between the base portion and the electrode tip portion, the gap forming portion having an arc surface formed into a side of the cylindrical conductive element and an arc forming location at an end of the arc surface adjacent the angled surface. The arc surface of the first electrode is oriented toward the second electrode. Additionally, a cross-sectional area of the first electrode in the gap forming portion is smaller than a cross-sectional area of the first electrode located in the base portion, and a cross-sectional area of the second electrode in the gap forming portion is smaller than a cross-sectional area of the second electrode located in the base portion.

In a second aspect, an electrode is disclosed. The electrode includes a cylindrical conductive element constructed from a first conductive material having a first melting point and a second conductive material having a second melting point. The electrode has a base portion at a first end of the electrode, and an electrode tip portion at a second end of the electrode opposite the base portion. The electrode tip portion has an angled surface formed in the cylindrical conductive element. An electrode may also be bent using a different material, machined, or cast into the desired shape. The electrode has a gap forming portion between the base portion and the electrode tip portion, the gap forming portion having an arc surface formed into a side of the cylindrical conductive element and an arc forming location at an end of the arc surface adjacent the angled surface. The electrode has a narrowed region positioned at least partially within the gap forming portion and on an opposite side of the cylindrical conductive element. A smallest cross-sectional area of the electrode in the gap forming portion is formed at a location along the narrowed region and toward the base portion from the arc forming location.

In a third aspect, an overvoltage protection device is disclosed. The overvoltage protection device includes at least one overvoltage subassembly including a first frame portion and an opposed second frame portion, and one or more insulators mounted between the first frame portion and the opposed second frame portion. The subassembly further includes a first support mount mounted to the first frame portion and a second support mount mounted to the second frame portion, and a pair of opposed electrodes including a first electrode mounted in the first support mount and a second electrode mounted in the second support mount. The first electrode extends from the first support mount and the second electrode extends from the second support mount to approach each other at an incident angle, arriving at a gap, and the first electrode and the second electrode each have electrode tips diverging from the gap at a second angle, and are each constructed from a unitary conductive element.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
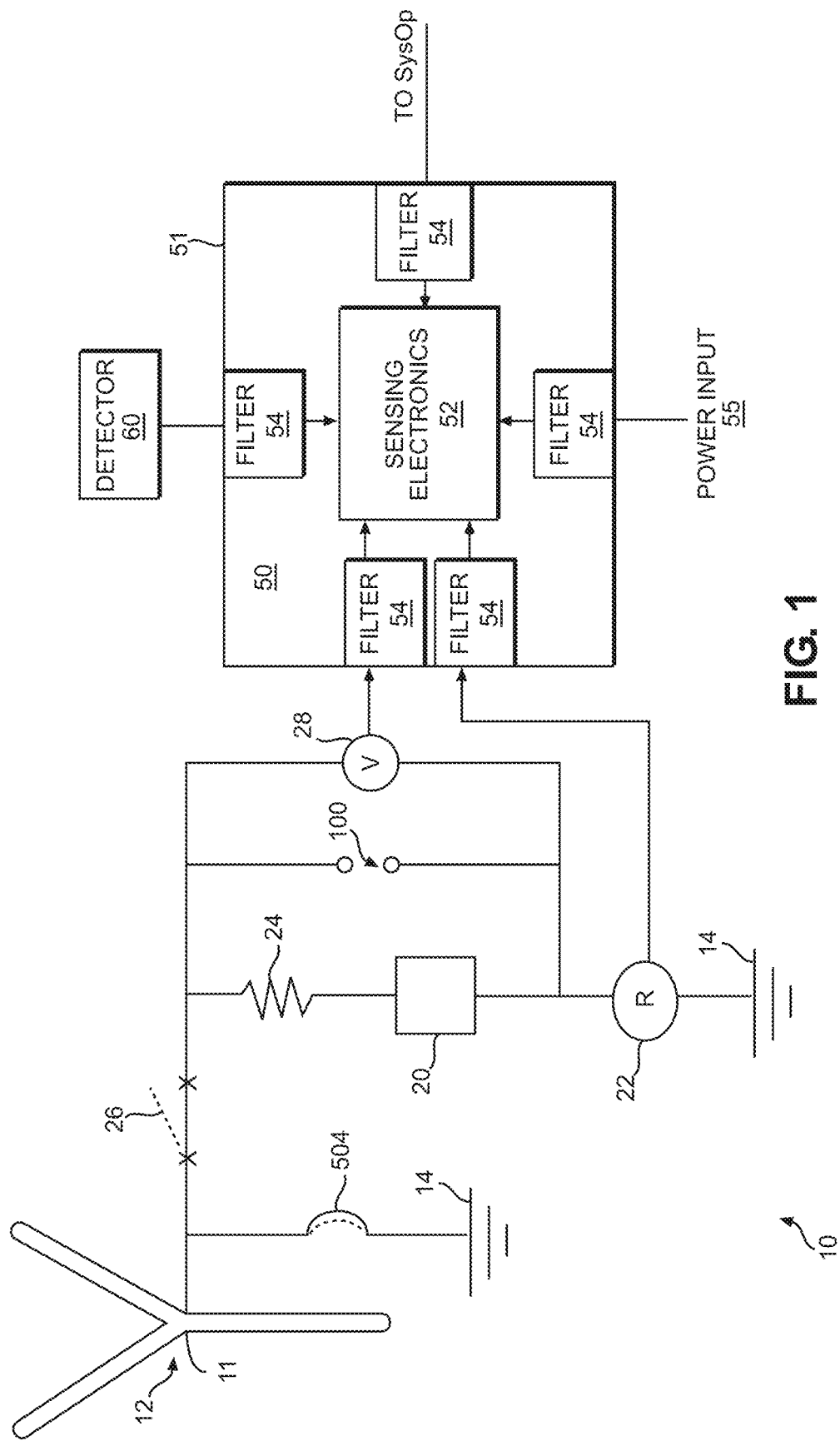
FIG. 1 is a first schematic of an example circuit in which an overvoltage protection device may be used, in accordance with some applications.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

As briefly described above, embodiments of the present invention are directed to an overvoltage protection device having improved geometry and flexibility to be operable at user definable voltages. In example embodiments, the improved geometry provides for simpler manufacturing, as well as improved performance over existing devices capable of adequate operation within the voltage and amperage ranges experienced by such a device. Specifically, the overvoltage protection device described herein includes a breakdown region at which a spark may form above a predetermined voltage; however, that breakdown region has an adjustable spacing, leading to an adjustable predetermined breakdown voltage, or set point. Still further, the electrodes used in the device for forming a spark are formed and oriented in a way that enhances the Lorentz force specifically on the arc and encourages any spark forming at a narrowest gap location to quickly move out from that gap to an electrode tip, thereby minimizing the ablation and/or melting of electrode material that may otherwise occur if the spark remains at the gap. In particular, the cross-sectional area of the electrodes used in the device may be manipulated to adjust the effect of physical structure on the electrical, magnetic, and Lorenz force effects of the electrodes on the arc in the case of an overvoltage event.

Additionally, in some examples described herein, the electrodes used in such a device may be manufactured from a single piece of stock material, such as cylindrical or rectangular stock material, and then cut or cast into a desired shape. In cases where the stock material is not easily bent (e.g., where made from tungsten or a tungsten alloy), and where joining together sections (welding, brazing, soldering or otherwise) of such material may have an adverse effect on overall strength, such a construction may improve durability and/or reliability.

Referring generally to aspects of the present disclosure, the Applicant notes that spark gap devices have typically been disfavored in critical applications because the high current, hot, violent arc may damage the surface shape and smoothness of the electrodes used to from the spark gap device, often right at the narrowest point of the gap where the arc first is formed as voltage rises. This damage can take a few forms.

One kind of damage is the removal of material due to melting, evaporation, ablation and material transfer as current carries material from one electrode to the other—generally the gap distance will increase with each arc event, and this alone will cause the effective set point to drift to higher voltages with each event. This increase in gap distance will be faster with higher current and voltage (more energy) in a narrow gap. This gap width will increase with the longer duration of the arc.

Another kind of damage has somewhat the opposite effect and is damage to the smoothness of the electrode surfaces right at the narrow point or gap where the arc first is formed as voltage rises. As background, an arc is difficult to form between two spheres with smooth surfaces (requiring higher voltage) but is easier to form between two spheres with rough surfaces (requiring lower voltage). That is because an electric charge tends to concentrate and more easily discharge or leave from sharp points or where there are small radiuses, sharp edges, or plateaus of conductive material instead of a polished and uniform large radius. As arcs form and damage the surface of electrodes in a narrow gap, this damage to the surface may generate a rougher surface, which in turn will make the arc easier to form. This can cause the effective set point to drift to lower voltage with each event when compared to a smooth surface of the same gap distance. This effect can be increased by choosing an electrode composed of two different metals (a matrix) with two different melting points. Very large currents (involving many coulombs of charge crossing the gap) cause more potential damage, and very large current and voltage causes greater violence and heat and faster damage and longer time continues the damage.

In some embodiments, the spark gap devices described herein are designed to better balance these two opposite damage effects, i.e., to purposely manipulate and fine tune the balance such that the gap slightly widens at the same time as the surface slightly roughens, so as to maintain a stable and reliable set point over multiple fault events with high current, long duration and a narrow gap distance.

Referring now to FIG. 1, an example embodiment of an overvoltage protection assembly 10 is shown, which can include an overvoltage protection device 100. In the example shown, a transformer 12 may be electrically connected to a ground 14 at a transformer neutral 11 and via a protection circuit. In the example shown, the protection circuit may include a DC blocking component 20, optionally connected in series with a resistor 24. A Rogowski coil may be used as a current sensor, for example by monitoring voltage across the resistor 22 via a monitoring circuit, such as electronics 52.

Figure 2:
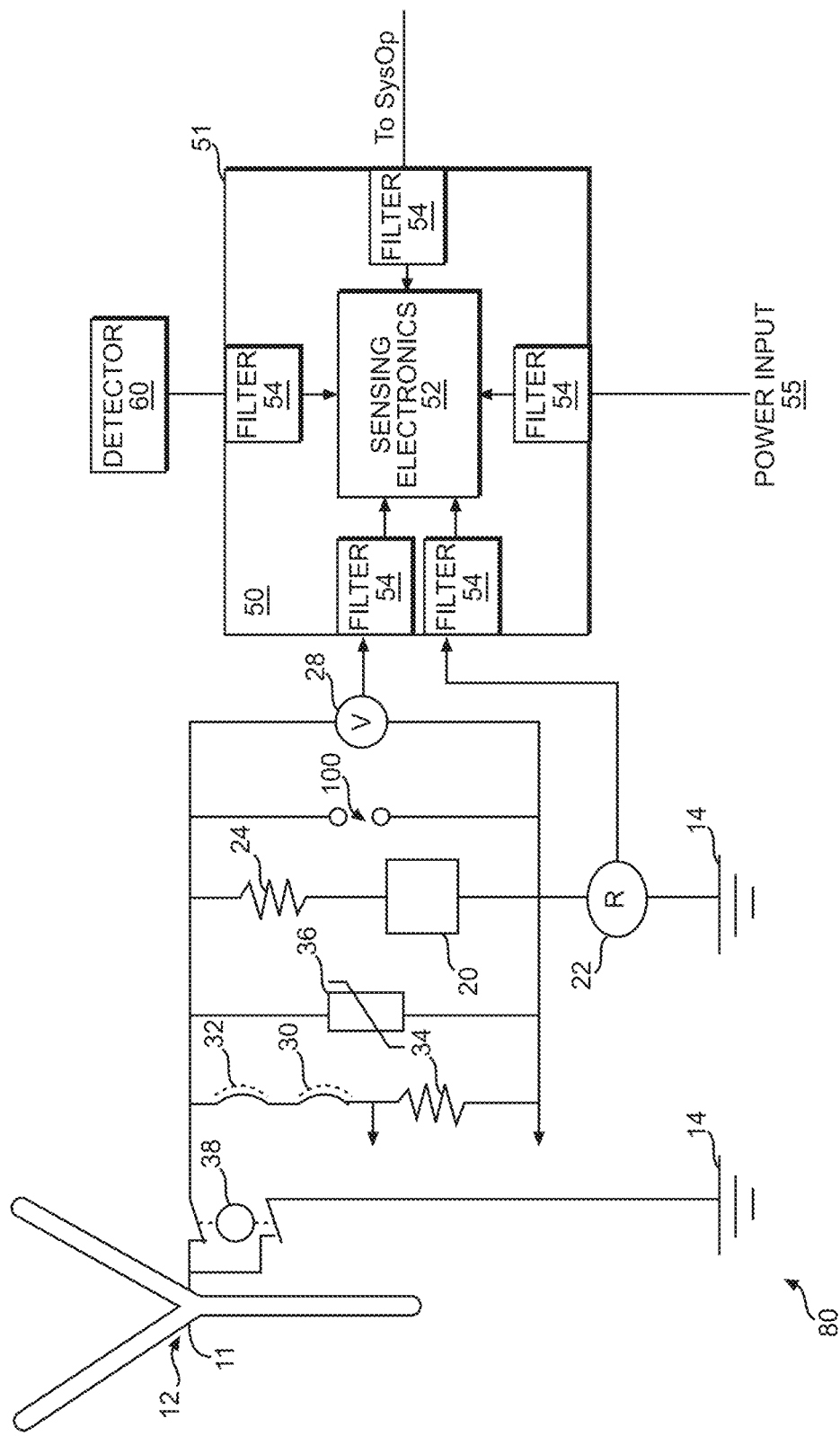
FIG. 2 is a second schematic of an example circuit in which an overvoltage protection device may be used, in accordance with some applications.

In the example shown, a disconnect switch 26 may separate the protection circuit from the transformer neutral 11. A manual grounding switch 504 may be used to ground the transformer neutral, for example for maintenance applications. In alternative embodiments, a Kirk Key 38 can be used, as seen in FIG. 2.

In the embodiments shown, the overvoltage protection device 100, seen as a spark gap device, is used for ground fault protection for high voltage (HV) and extra high voltage (EHV) power equipment. In the example embodiments described herein, the Overvoltage protection device 100 provides reliable, repeat use overvoltage protection useable to discharge voltages experienced at the transformer neutral 11 above a particular threshold. In examples, the overvoltage protection device 100 may be configured for discharge in the event of voltages at the transformer neutral 11 over about 1 kV. In some examples, the overvoltage protection device is configured to discharge at approximately 4 kV. In other examples, the overvoltage protection device 100 is configured to discharge at a selectable voltage between about 4-12 kV, or up to about 28 kV. As described in further detail below, the overvoltage protection device 100 is capable of repeat use in the event of overvoltage events discharging high current from the transformer neutral 11. Such high currents may exceed 1,000 amps, and in some instances, may exceed 12,000 amps. In still further examples, such currents may approach or exceed 20,000 amps, or even up to and exceeding 60,000 amps. A typical range of currents experienced across the overvoltage protection device 100 is in the range of 1,000 to 20,000 amps.

As further described below in conjunction with FIGS. 3-23, the overvoltage protection device 100 contemplated by the current disclosure provides protection capable of long life and allows reuse for many (e.g., about 10 to 30 or more) ground fault events. The overvoltage protection device 100 includes electrodes positioned at a predetermined distance from one another that corresponds to the selected breakdown voltage, as noted below. In some instances, the positioning/distance between two opposed electrodes is adjustable to adjust the breakdown voltage prior to installation or during maintenance.

Additionally, in the example shown, a voltage probe 28 may monitor a voltage across the DC blocking path. In example embodiments, the voltage probe 28 allows a monitoring circuit to detect when voltages reach a threshold, and can monitor the voltage across the overvoltage protection device 100.

In the embodiment shown, a monitoring circuit 50 includes sensing electronics 52 that receive signals from the voltage probe 28, Rogowski coil 22, and a detector 60 useable to detect harmful electromagnetic signals. An example detector is described in U.S. Pat. No. 8,860,402, entitled "Electromagnetic Field Detection Systems and Methods", the disclosure of which is hereby incorporated by reference in its entirety.

In the embodiment shown, the sensing electronics 52 can be implemented using a processor or other programmable circuit, and are positioned within an electrically shielded enclosure 51. The shielded enclosure 51 includes a plurality of filters 54 positioned at a periphery to prevent high frequency, high power electromagnetic signals from entering the enclosure. This prevents exposing the sensitive control and sensing electronics to potential interference and damage. The filters 54 can typically be a low pass or band pass filter with surge suppression to suppress any high voltage signals from entering the enclosure. In the embodiment shown, the shielded enclosure 51 is an EMP/IEMI faraday shielded enclosure with conductive gaskets around all door openings to provide radiative protection from electromagnetic frequencies typically from about 14 kHz to 10 GHz.

Referring to FIG. 2, a further embodiment of an electrical protection circuit 80 is shown in which the overvoltage protection device 100 may be used. In the example shown, the electrical protection circuit 80 is interfaced to a neutral 11 of a transformer, to provide grounding of the neutral 11 in the event of harmful signals derived from GIC (solar storms) and EMP E3 pulses. The circuit 80 includes a key interlock 38 (also referred to as a Kirk-key), which is used to selectively provide a locking connection of the transformer neutral 11 to ground 14. Additionally, an AC breaker 32 is positioned in series with a DC breaker 30 and shunt resistor 34. The AC breaker 32 is, in a default embodiment, in a closed position, preventing AC grounding of the neutral 11. The DC breaker 30 is by default in a closed position, and configured to switch open in the event of a large DC current between the transformer neutral 11 to ground 14, as previously described, and explained in U.S. Pat. No. 8,878,396, entitled "Continuous Uninterruptable AC Grounding System for Power System Protection", the disclosure of which was incorporated by reference in its entirety above. The shunt resistor 34 provides an interface across which sensing electronics 52 can be connected, e.g., to detect a current along the path through the switch assembly that includes AC breaker 32 and DC breaker 30.

In the embodiment shown, a parallel path between the transformer neutral 11 and ground 14 includes a power resistor 24 in series with a DC blocking component 20. The DC blocking component can be, for example, a capacitor bank or other equivalent system. The power resistor 24, in some embodiments, corresponds to an approximately one ohm power resistor configured for large current applications, and useable to limit current occurring based on discharging from the DC blocking component 20. The DC blocking component 20 can, for one example when implemented as a capacitor bank, have a 14 kV maximum limit, a high capacity for storage, and a one ohm reactance, thereby allowing the capacitor bank to provide quick reaction to changes occurring in the circuit.

Optionally, in the example shown, a surge arrester 36, such as a metal oxide varistor (MOV), can also be used to limit voltage so as to manage surge events between the transformer neutral and ground. The overvoltage protection device 100 can be connected between the transformer neutral 11 and ground 14. In operation, the overvoltage protection device 100 may spark (and therefore discharge voltage/current upon occurrence of a voltage over about 4 kV, and in some instances, over about 8-10 kV. Of course, other thresholds could be used as well, as discussed below. It is noted that typical GIC protection events will pass through the surge arrester 36, while high voltage events may trigger operation of the overvoltage protection device 100. They key interlock 38 prevents protective operation of the overall unit by deactivating the current transformers, thereby disconnecting the transformer neutral 11 and ground 14 (in a default case).

In addition to the above, in the embodiment shown, a voltage probe 28 can be connected between the transformer neutral 11 and ground 14 as well, to monitor an instantaneous voltage level at the transformer neutral. Such a voltage monitor may be used to cause the sensing electronics to control switches 30, 32 (control connections not shown). Details regarding operation of such control switches via the sensing electronics are provided in U.S. Pat. No. 10,199,821, entitled "Systems and Methods for Actuating a Transformer Neutral Blocking System", the disclosure of which is hereby incorporated by reference in its entirety.

It is noted that alternative embodiments of such an electrical protection circuit 200 may be utilized as well, in different embodiments of the present disclosure. Example embodiments of an electrical protection circuit, and details regarding their operation, are further provided in U.S. Pat. Nos. 8,878,396 and 8,537,508, the disclosures of which are hereby incorporated by reference in their entireties.

Overall, the overvoltage protection assembly 100 of FIGS. 1-2, as with the other embodiments discussed herein, overcomes a problem with many spark gaps when used in narrow gap, high current situations, in that the high current arc melts and destroys the metal in the area of the narrow gap unless a particular geometry and materials are used in the device. Spark gap devices have typically been disfavored because, at high current levels and moderate to low voltage levels (below 28 kV) requiring narrow gaps, such devices may be damaged due to very large Lorentz forces experienced. The longer duration of a fault event is particularly problematic as they typically last more than 48 milliseconds (e.g., time needed for phase circuit breakers to operate to clear the fault). That amount of time is roughly 800 times longer than a lighting stroke which typically lasts around 60 microseconds. The long duration of the fault allows the arc plasma to significantly ablate the spark gap region, which results in a wider gap after the fault event and a subsequent higher voltage set point or breakdown voltage for a second fault event. Older spark gap designs utilize a "Jacobs ladder" design which rely on heat to slowly rise the arc out of the spark gap area. These designs may work for short duration events (such as lightning) positioned on high voltage transmission lines or on the high voltage side of a transformer due to the high voltage insulation limits which allow for wider gap distances (spaced several inches apart). These older designs can also work for low current/low energy events, but will not work for longer duration, high current/high energy events where a narrow gap is required (spaced a few millimeters apart or less) such as on the neutral of a transformer as the neutral insulation voltage limit requires a very narrow gap distance (e.g. voltage set points typically below 15 kV). The reliance on heat to rise the arc up the Jacob's Ladder also allows the arc plasma to linger far too long in the tight space causing severe ablation which significantly widens the gap causing an extreme increase in the set point if a second overvoltage event were to occur.

By way of contrast, in an example embodiment as shown in FIGS. 1-2, the potential destructive situation at an overvoltage protection device can be overcome using angled conductors prior to and approaching the spark gap region and angled conductors leading away from the gap at which a spark is formed. In general, such angled conductors prior to the spark gap region can enhance the Lorentz force on the arc (with other geometric features of the device and its supporting assembly, as discussed below) which decreases the time the arc lingers in the spark gap region and provide diverging conductive paths to direct the movement of an arc out of the area of narrowest gap distance to allow energy dissipation at the tip of the electrodes rather than in the spark gap region. The geometry of the overvoltage protection assembly 100 ensures that, for the range of electrical events dissipated using such an assembly, a force will be present to provide rapid movement of the arc out of the narrow gap region. Such a geometry as a part of an overvoltage protection assembly, such as overvoltage protection assembly 100, can assist in limiting degradation, allowing for reuse for many ground faults.

Referring now to FIGS. 3-23, additional details regarding an example overvoltage protection assembly 100 are provided. In general, the overvoltage protection assembly 100 includes one or more overvoltage protection devices, which can be included in overvoltage protection subassemblies. Each subassembly includes a pair of electrodes having a unique geometry providing improved performance. Details regarding the electrode geometry are provided below in conjunction with FIGS. 11-20, and performance of the electrode within the context of the overvoltage protection assembly is discussed in connection with FIGS. 21-23. Additionally, electrodes used in the overvoltage protection assembly 100 are improved in terms of manufacturability, since each may be machined from a single piece of stock material into the desired shape/orientation.

In the example embodiments discussed herein, a gap distance between two opposed electrodes of an overvoltage protection device is selected such that a required breakdown voltage can be achieved. This distance can be calculated using a Paschen's law relationship, expressed as a relationship between the breakdown voltage, the gas in the gap (i.e., air), the pressure experienced, and the distance between adjacent electrodes forming the gap. Although in some instances this distance can be set at a time of manufacturing, as discussed herein, the overvoltage protection assembly 100 allows field-adjustment of the gap distance between adjacent electrodes such that a higher or lower breakdown voltage may be selected. Additionally, when an overvoltage protection assembly 100 utilizes a plurality of pairs of electrodes (e.g., multiple subassemblies, each having a pair of electrodes), different breakdown voltage levels can be selected for each subassembly, thereby forming a set of parallel overvoltage protection devices having different breakdown voltage levels. Of course, in certain arrangements, each of the overvoltage protection subassemblies may be set to have a breakdown voltage that is substantially the same. This results in arc formation across potentially more than one of the subassemblies in the case of an overvoltage event. This can further reduce surface degradation and resulting gap changes on any individual subassembly by dividing the number of arcs across the number of subassemblies.

Figure 3:
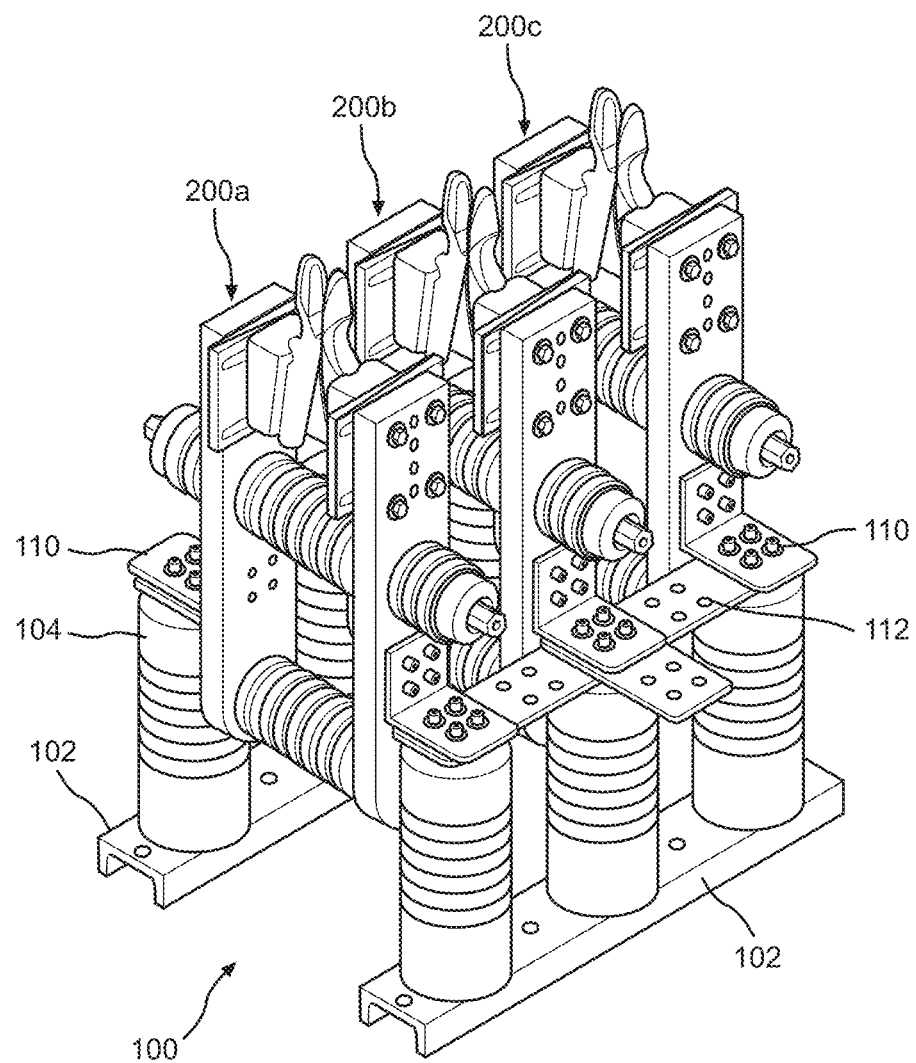
FIG. 3 is a perspective view of an overvoltage protection device according to an example embodiment.
Figure 4:
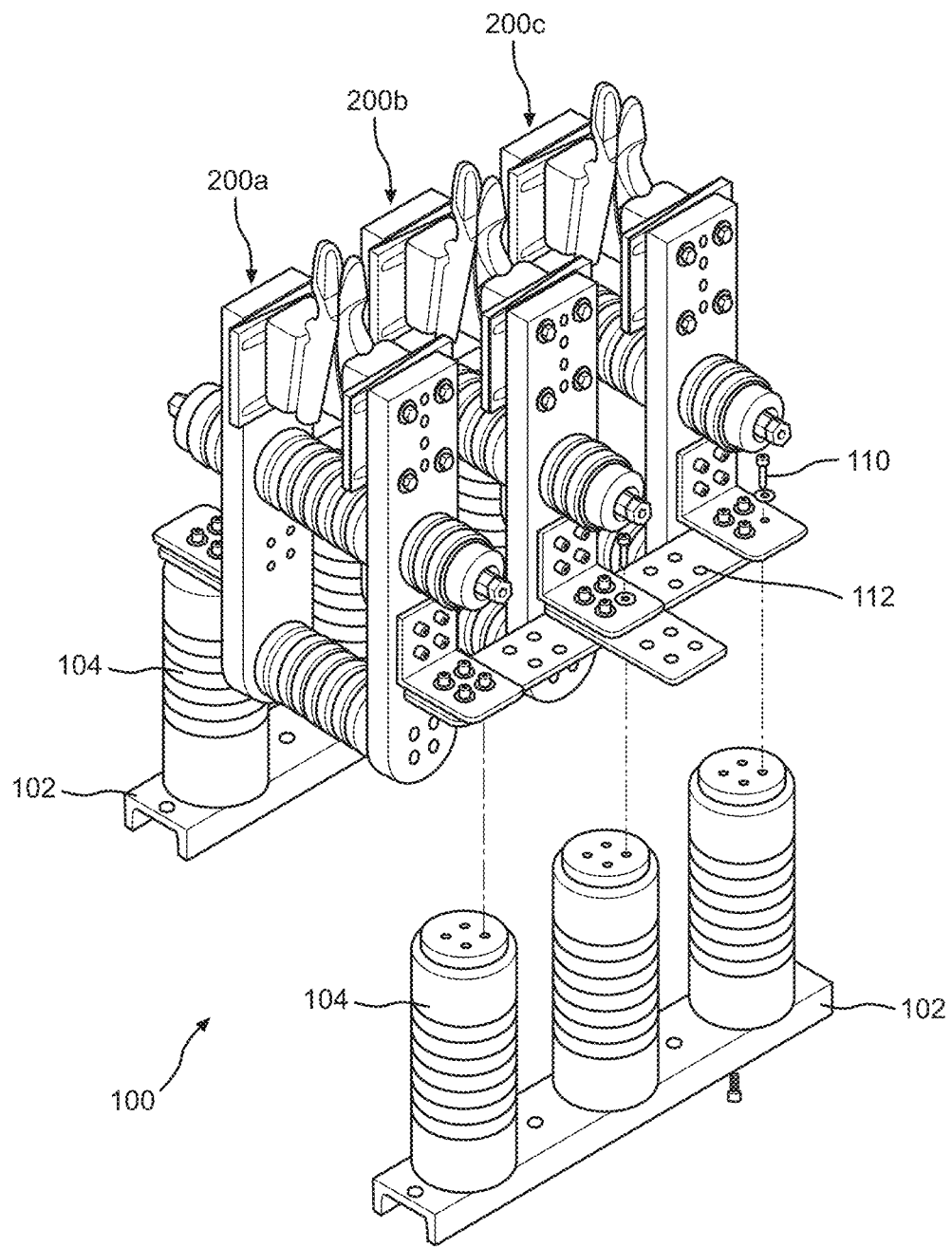
FIG. 4 is the perspective view of the overvoltage protection device of FIG. 3 showing aspects of the mounting structure being removed.
Figure 5:
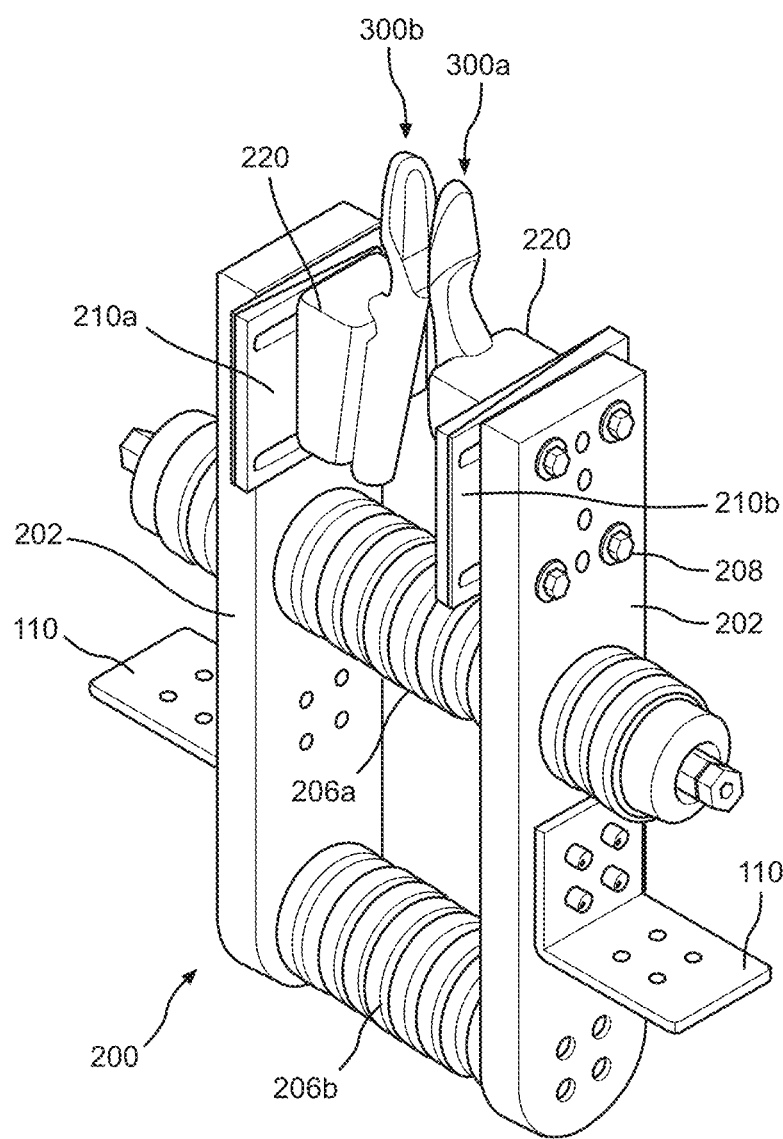
FIG. 5 is a perspective view of an overvoltage protection subassembly useable within the overvoltage protection device of FIG. 3.
Figure 6:
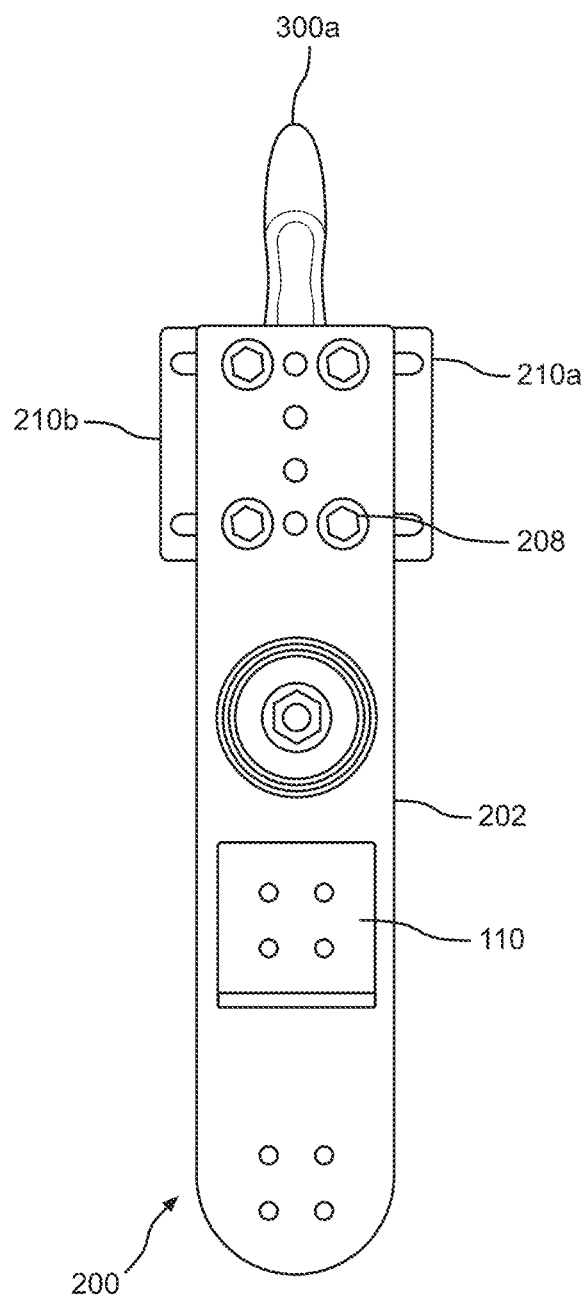
FIG. 6 is a side plan view of the overvoltage protection subassembly of FIG. 5.

Referring to FIGS. 3-4, perspective views of an example overvoltage protection assembly 100 are shown. In this example, the overvoltage protection assembly 100 includes a plurality of overvoltage protection subassemblies 200. Although in the example seen in FIGS. 3-4 three separate overvoltage protection subassemblies 200 are shown (labeled as subassemblies 200a-c), it is recognized that in alternative embodiments, one, two, or more than three such subassemblies may be included.

In the example shown, the overvoltage protection assembly 100 includes mounting rails 102, on which one or more support insulators 104 may be mounted. In the example shown, the mounting rails 102 are parallel to each other and include a plurality of mounting positions for the support insulators 104. Each of the support insulators 104 is oriented vertically, and is cylindrically-shaped (e.g., either round or oval in cross-sectional shape). However, other orientations or shapes (e.g., square or rectangular in cross-sectional shape) may be used.

In the example shown, a pair of support insulators 104 is provided to support each of the overvoltage protection subassemblies 200. Each subassembly 200 is mounted to the pair of support insulators 104 via a conductive mounting bracket 110 on each side of the subassembly. In examples using more than one subassembly 200, a conductive bus 112 may also interconnect between the conductive mounting brackets 110 and insulators 104 along a side of the subassemblies 200 and above a common set of support insulators 104 above a mounting rail 102.

In the example arrangements shown, the positioning of the insulators 104 between mounting brackets 110 at each side of a subassembly 200 provides strength at both sides of the structure of the subassembly 200 to ensure that the electrodes are supported at a maintained relative position to counter any Lorentz force component that would encourage separation or movement of the electrodes, while harnessing the "vertical" Lorentz force component to encourage the arc out of the gap between such electrodes. Generally, because of the voltage and current levels at which an overvoltage protection assembly 100 may be used (i.e., the set point, or range of set points, used), in combination with the duration of such an overvoltage event, the magnitude of such a Lorentz force will be significant, and much different from that of other types of overvoltage devices (e.g., lightning arresters); such devices typically experience significantly lower forces and have far lower risk of damage from Lorentz force.

When the overvoltage protection subassemblies 200 are mounted to the mounting rails 102 via the insulators 104, the overvoltage protection subassemblies 200 are positioned in parallel with each other and electrically connected in parallel with each other. Accordingly, as overvoltage events occur and the breakdown voltage associated with each overvoltage protection subassembly may change slightly, the subassembly having the lowest breakdown voltage will experience a spark across its electrodes at that (lowest) breakdown voltage, as discussed further below.

In the example shown, each overvoltage protection subassembly 200 includes opposed frame portions 202, which receive the mounting brackets 110. The frame portions are interconnected at a fixed distance from one another by support insulators 206. The support insulators 206 (shown as upper insulator 206a and lower insulator 206b, although additional insulators could be used as well). are positioned in a direction to support the opposed frame portions 202 as well as electrodes 300. The support insulators 206 counteract forces in a direction that would intersect the frame portions 202 (e.g., a direction of the formation of a spark across the gap between electrodes). In the example shown a pair of insulators 206 are provided for each pair of opposed frame portions 202; however, an alternate embodiments more or fewer insulators may be used, so long as adequate strength is provided to ensure forces on the frame portions 202 and electrodes 300 may be withstood in the event of a spark forming across the gap.

In the example shown, an upper insulator 206a may surround a support bolt 207 extending through the opposed frame portions 202. The support bolt is electrically isolated from the opposed frame portions 202 by the upper insulator 206a, and improves the overall tension strength by which the opposed frame portions 202 are supported. Accordingly, a significant force applied at electrodes (discussed below) in a direction extending between the electrodes can be withstood by the subassembly 200 without significant relative movement of the opposed frame portions 202.

In each of the embodiments discussed herein, each subassembly is configured to mount two complementary electrodes 300, referred to also herein as electrodes 300a-b. In example embodiments, each electrode 300 is formed from a single cylindrical conductive element. For example, each electrode may be constructed from a single cylindrical metallic element, such that the electrode has a maximum cross-sectional area approximately equal to the cross-sectional area of the stock cylindrical metallic element (e.g., the metallic element is formed by removal of material from such an element).

In example embodiments, the electrodes 300 may be, for example made from a tungsten matrix or alloy, or utilizing some other conductive material. For example, each electrode may be formed from tungsten/copper matrix or alloy or niobium. Tungsten, tungsten/copper matrix or alloy, and niobium have higher melting points and are stiffer than other metals, such as copper alone, and thus allow the electrodes to withstand the energy dissipated by arcing events better than would many other conductive materials. Details regarding construction and operation of such electrodes 300 are provided below in conjunction with FIGS. 12-20.

Figure 7:
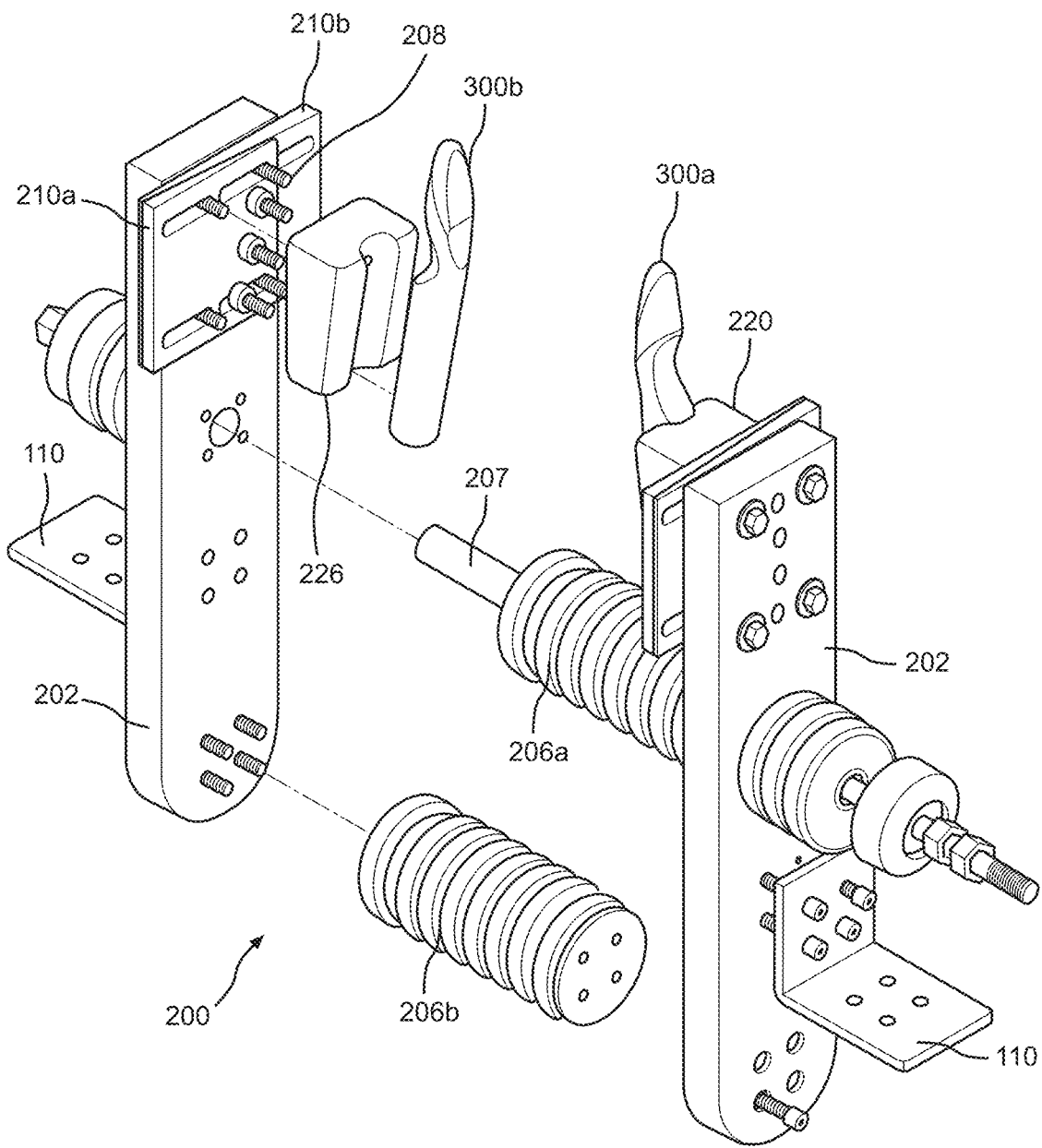
FIG. 7 is a perspective, partially-exploded view of the overvoltage protection subassembly of FIG. 5.
Figure 8:
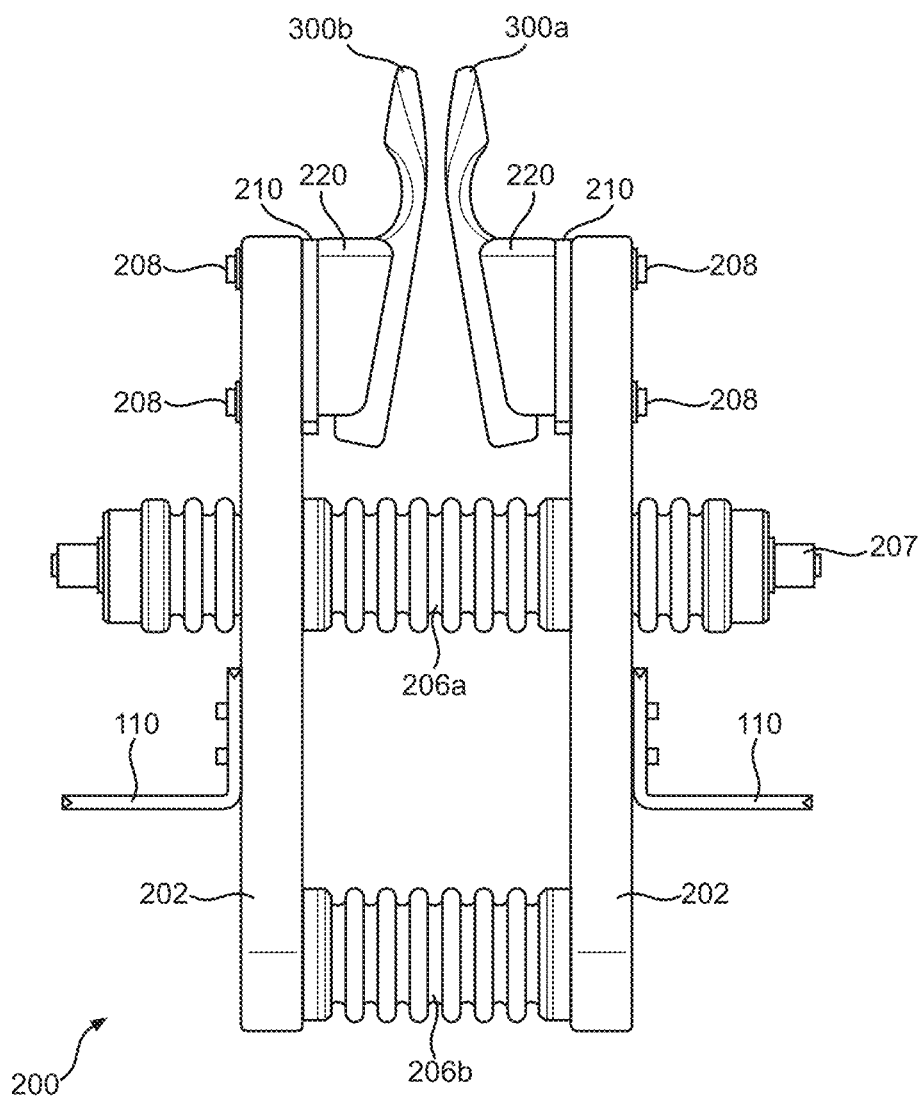
FIG. 8 is a front plan view of the overvoltage protection subassembly of FIG. 5, with electrodes set to a high breakdown voltage configuration.
Figure 9:
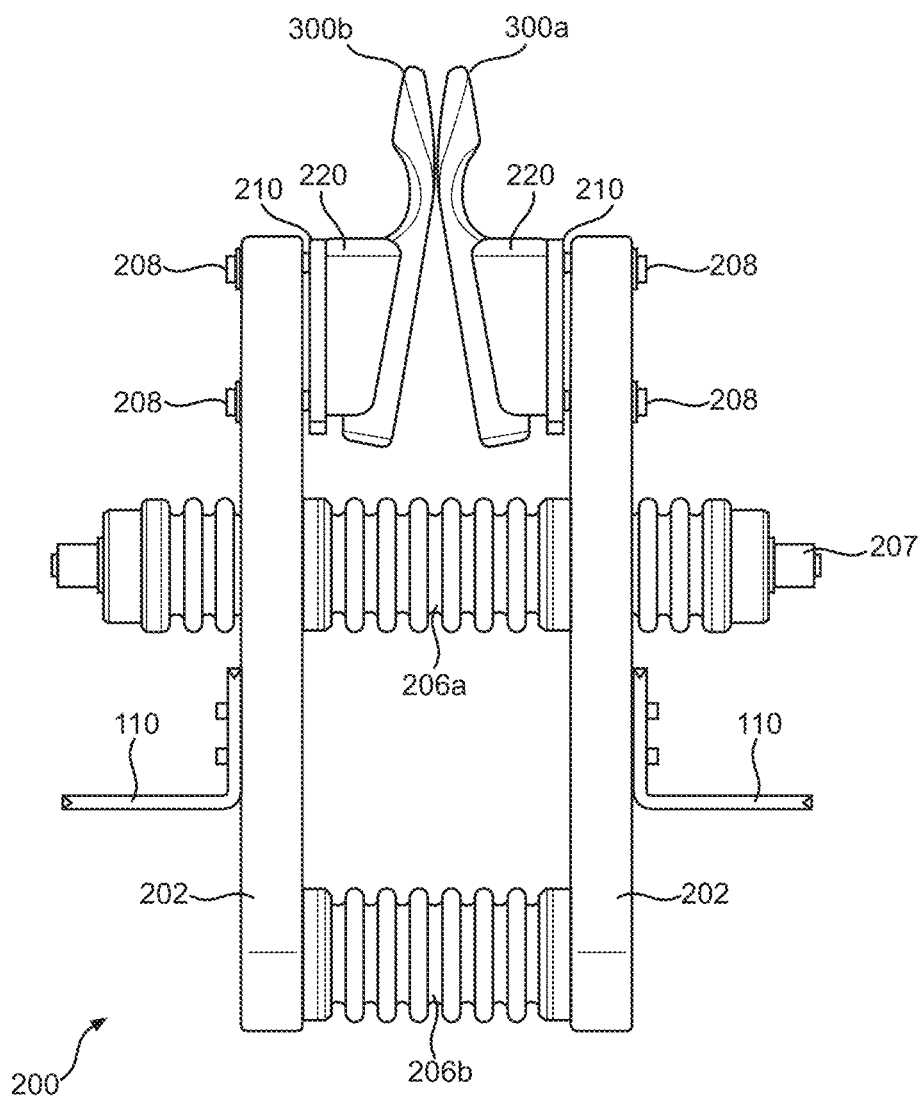
FIG. 9 is a front plan view of the overvoltage protection subassembly of FIG. 5, with electrodes set to a lower breakdown voltage configuration as compared to the arrangement of FIG. 8.

In the arrangement shown in FIGS. 5-9 each electrode 300 is mounted to a corresponding frame portion 202 via a plurality of bolts 208 (seen in FIG. 7). The bolts extend through the frame portion 202, and into a support mount, such as support block 220. To control the relative distance between electrodes 300a-b, a pair of ramped plates 210a-b may be mounted, via the bolts, between the frame portion 202 and the support block 220. The ramped plates 210a-b may be positioned at the selectable positions and held in place by the bolts 208 to control a distance away from the frame portion 202 of the support block 220. Accordingly, the nearest distance between the two adjacent electrodes 300a-b may be controlled during field installation of the overvoltage protection device 100, and customization of the breakdown voltage due to the distance between electrodes 300a-b may be possible. Accordingly, as seen in the comparative examples of FIGS. 8-9, depending on the relative positions at which the ramped plates 210a-b, are maintained, the distance between each frame portion 202 and support block 220 may be set, thereby changing the distance between electrodes 300a-b between a wide position (seen in FIG. 8) and a narrow position (seen in FIG. 9). Such a distance may vary and be set at any distance between about 20 mm and about 1 mm, with typical distances being about 2-3 mm to provide a breakdown voltage in the low-kilovolt level (typically about 4-12 kV).

Figure 10:
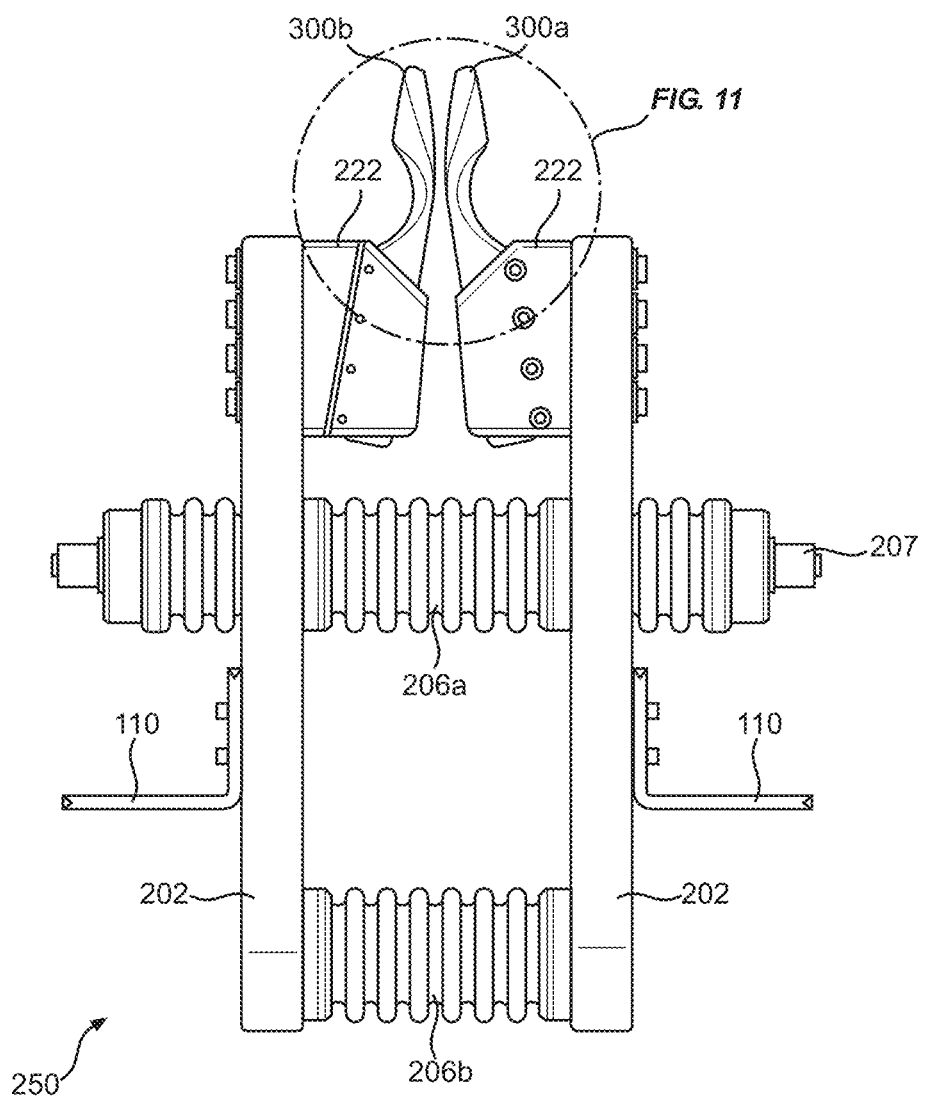
FIG. 10 is a front plan view of an overvoltage protection subassembly, according to an alternative embodiment.
Figure 11:
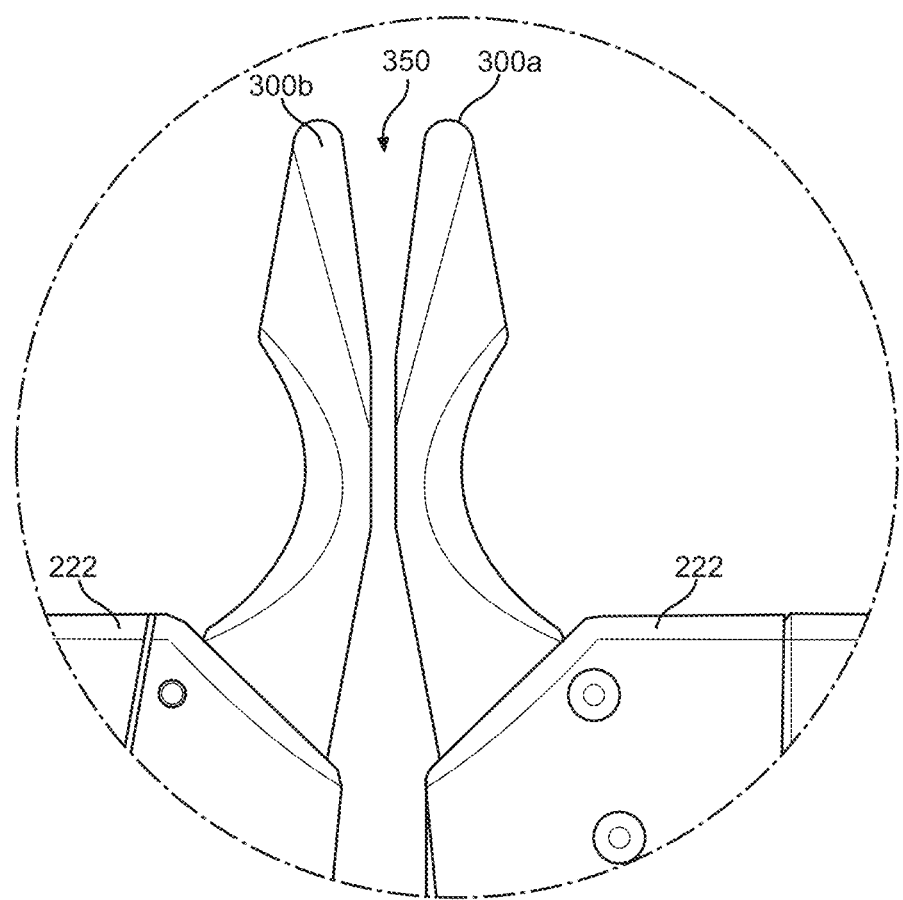
FIG. 11 is a close-up view of a portion of the overvoltage protection subassembly of FIG. 10 illustrating a geometry of adjacent electrodes, in an example embodiment.
Figure 12:
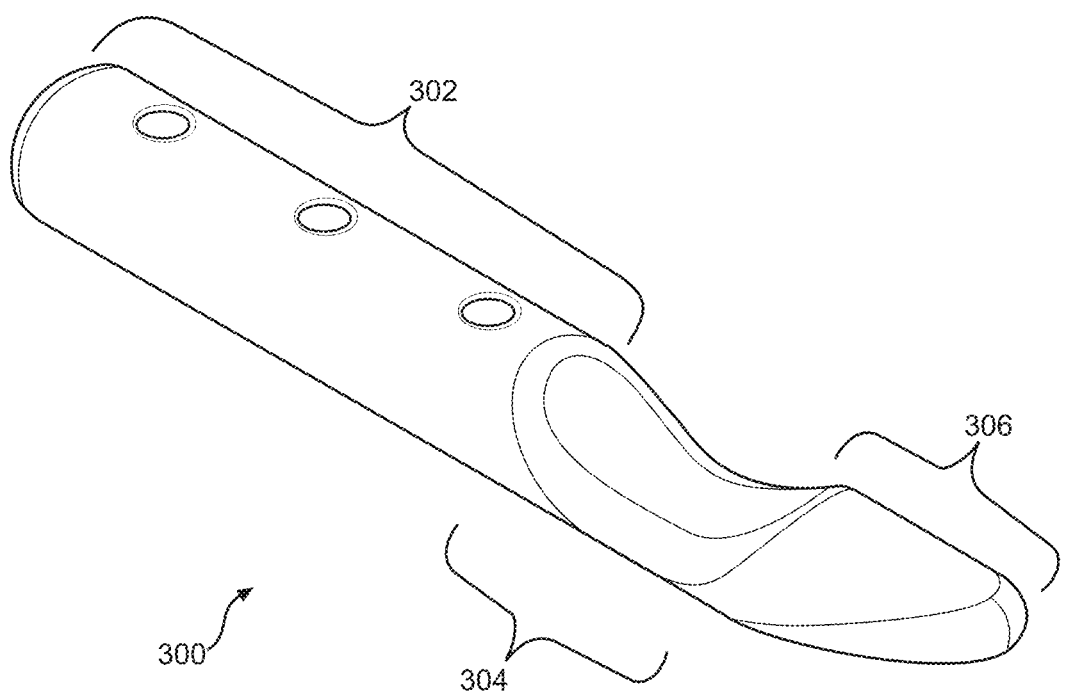
FIG. 12 is a perspective view of an example electrode of an overvoltage protection device, according to an example embodiment.

Referring to FIGS. 10-11, an alternative configuration of a subassembly, seen as subassembly 250 is provided. In this example, the ramped plates 210a-b are excluded. Rather, each frame portion 202 is directly attached to a support block 222. The support block 222 includes a sheath to hold each electrode 300 that may be tightened to clamp the electrode 300 in place at a user definable location. Accordingly, by sliding each electrode into the sheath of the support block 222 to a desired location the relative distance between adjacent electrodes 300a-b may be controlled. In other embodiments, the frame 202 and support block 222 may be made from a single piece of material.

Referring to FIGS. 1-11 generally, it is noted that although in the embodiments shown two complementary electrodes are included in each subassembly, other configurations are possible as well. For example, in some cases, the electrodes may be dissimilarly-shaped. In such cases, one electrode may be formed as discussed herein (e.g., in accordance with the details described below) and another electrode may be formed from a straight conductive rod. In still further examples, a plurality of subassemblies may be formed using separate electrodes as discussed herein, positioned opposed to a single conductive plate or rod electrically connected to a grounding connection.

Referring now to FIGS. 12-17, details regarding a geometry of the electrode 300 usable within the overvoltage protection device 100 are provided. As noted above, the electrode 300 is constructed from a single piece of conductive material, typically a constant alloy or matrix, which provides adequate strength to withstand multiple overvoltage events in the kilovolt and kiloamp range. Overall, it is expected that the geometry of the electrode 300 allows for formation of a gap region between two adjacent electrodes having a reliable distance and geometry, as well as having electrode tips toward which any arc forming between the electrodes may be encouraged. Still further, a geometry and positioning of the electrodes encourages a greater Lorentz force occurring in a direction perpendicular to arc formation (e.g., in the vertical direction as seen in FIG. 10) to encourage any arc formed at the gap toward the electrode tips, while being sufficiently strong to withstand Lorentz forces occurring in the direction the arc is formed (e.g., due to the forces on opposed conductors 300a-b.

As seen in FIGS. 12-17, each electrode 300 may be constructed from a single element, such as a single cylindrical element of bar stock having a round or oval cross-sectional shape. As compared to existing electrode designs, which may have greater thickness or may have a greater length between the gap at which an arc may form and the electrode tip, the electrode 300 of the present disclosure does not require bending or welding electrode pieces together, and therefore provides strength with ease of manufacturing.

Figure 13:
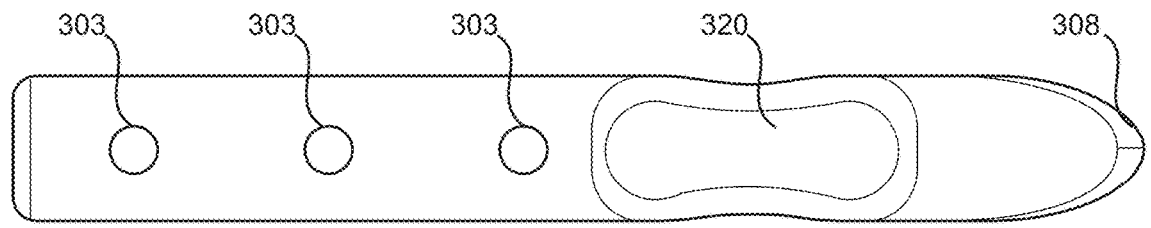
FIG. 13 is a mounting-side plan view of the example electrode of FIG. 12.
Figure 14:
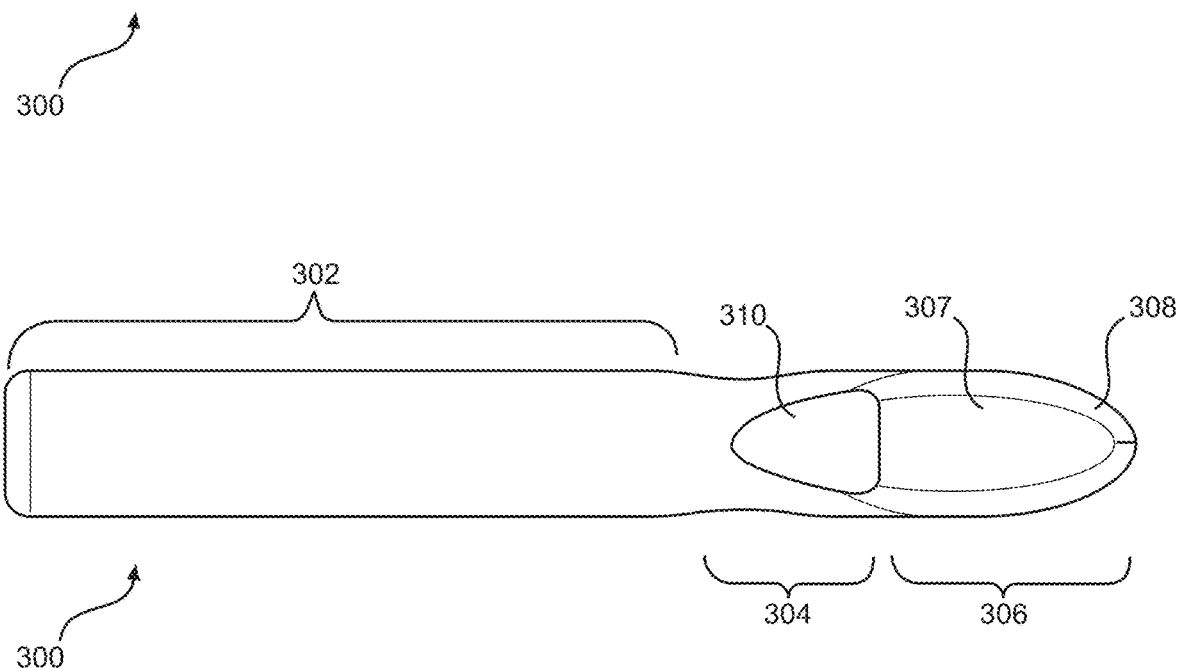
FIG. 14 is a spark-forming side plan view of the example electrode of FIG. 12.

Specifically referring to FIGS. 12-16, each electrode 300 includes a base portion 302, a gap forming portion 304, and an electrode tip portion 306. The base portion 302 remains generally cylindrical, and may or may not include one or more mounting holes 303 that may receive bolts for retaining the electrode within a support block (e.g., support blocks 220 above). In the example shown, the base portion 302 is approximately 5 to 6 inches in length, with regularly spaced mounting holes 303 (three mounting holes spaced apart by 2 inches each, as seen in FIG. 13). However, other lengths and arrangements of mounting structures may be used as well.

The electrode tip portion 306 is at an opposed end of the electrode as compared to the base portion 302. Generally, the electrode tip portion 306 is formed by machining an angled surface 307 extending from the gap forming portion 304 to a tip 308 of the electrode 300.

The gap portion includes an arc surface 310 on a side of the electrode intended to face the opposing electrode. The arc surface 310 is a generally flat surface of the electrode 300, in some embodiments. In some embodiments, the arc surface 310 is straight (linear) in a direction along the electrode 300, but is slightly curved (non-planar) in a circumferential direction. In other embodiments the arc surface 310 may be curved in the direction along the electrode. The arc surface 310 is formed at an angle that is different from the angled portion 307 extending to the electrode tip 308. In particular, the angle at the arc surface 310 is a shallower angle as compared to the angled portion 307 extending to the electrode tip 308. An angle of approximately 1-30 degrees can be used in the arc surface area 310. In some examples, an angle of 5-20 degrees could be used. In some particular examples, the incident angle in the arc surface area 310 is approximately 8-9 degrees (roughly 8.5 in the example shown in FIG. 15), and an incident angle of approximately 2-50 degrees (roughly 17 degrees in the example shown) can be used for the angled portion 307. Other embodiments may use different angles; generally, combined incident angles of less than about 90 degrees are utilized.

Figure 15:
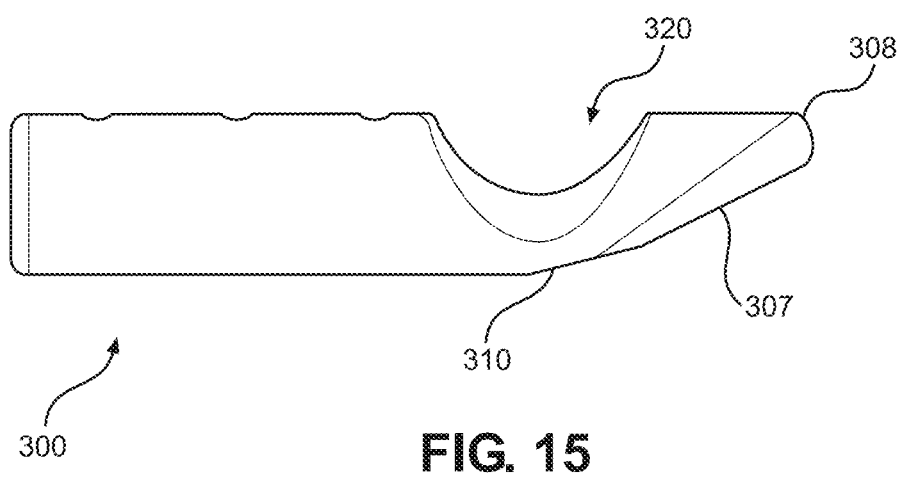
FIG. 15 is a front plan view of the example electrode of FIG. 12, showing example dimensions formable from cylindrical bar stock.
Figure 16:
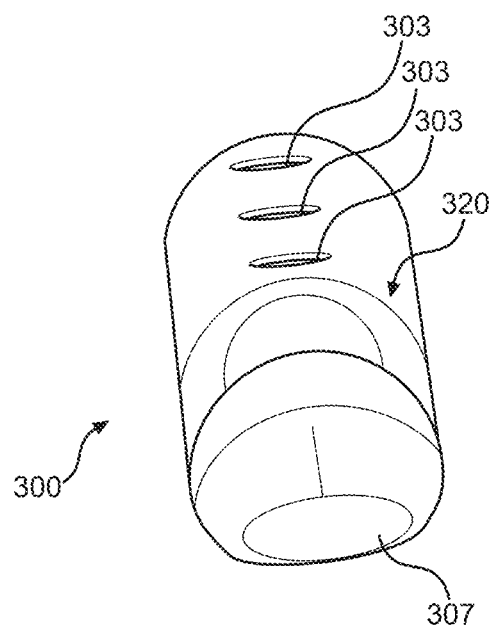
FIG. 16 is a top perspective view of the example electrode of FIG. 12.
Figure 17:
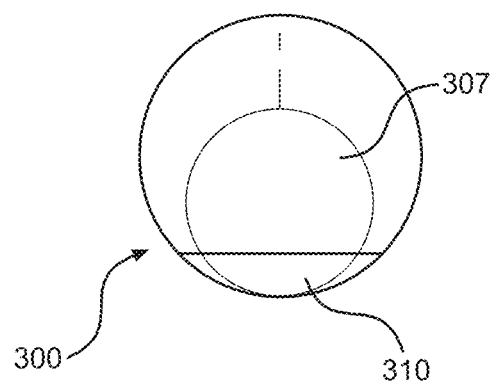
FIG. 17 is a top plan view of the example electrode of FIG. 12, illustrating machining of the electrode to form it from cylindrical bar stock, in an example implementation.

Additionally, the electrode tip portion 306 may have a variety of lengths, but is somewhat dependent on the thickness of the electrode and the angle formed in the angled portion 307. Generally, a steeper angle will lead to a shorter electrode tip portion 306, while an angle should not be so shallow that the nearest point between adjacent electrodes might occur at a location other than the gap forming portion 304 when two opposed symmetrically positioned electrodes are placed such that the base portions 302 approach at a desired incident angle. In the example shown, the tip portion can be between 1-4 inches; as seen in FIG. 15, the tip portion 306 is between 2-3 inches, e.g., approximately 2.63 inches.

Referring back to FIG. 11, a mounting orientation of the electrodes 300a-b is illustrated. As illustrated, when the electrodes 300a-b are mounted, a gap 350 is formed between the electrodes, which approach each other from the support blocks at an incident angle. The incident angle can be any of a variety of angles; typically, the incident angle is between 5-20 degrees from vertical (a total of 10-40 degrees). However, other oblique or non-straight angles could be used as well. For example, incident angles of 90 degrees or greater could be used, up to (but not including) 180 degrees. Additionally, the incident angle can be as narrow as desired so long as any supporting structure (e.g., the support blocks) are not positioned nearer each other than a gap spacing, which would cause a risk of arc formation across the support blocks rather than at the gap 350.

A narrowest distance between the electrodes is located at or near an end of the arc surface 310. Specifically, in the orientation shown in FIG. 11, the narrowest distance between electrodes is located at an upper most location of the arc surface 310, e.g., adjacent to the change in angle between the arc surface 310 and the angled surface 307 extending toward the electrode tip 306. Because the arc surface 310 is generally planar, the gap 350 is generally trapezoidal shaped, with a narrowest portion at a top of the arc surface 310 and a wider portion at the bottom of the arc surface. Accordingly, if a spark were to form within the gap 350, it is expected that the spark would form at or near the top of the arch surface 310 (top being based on the orientation seen in FIG. 11).

In the example shown, a difference in distance between the narrowest portion at the top of the arc surface 310 and the wider portion at the bottom of the arc surface is comparatively small (0.1-1 mm). To the extent any of the electrode 300 within the gap 350 ablates, a next narrowest portion of the gap 350 would be where a next arc would form. The small difference in distance between top and bottom of the arc surface 310 avoids large changes (e.g., increases) in breakdown voltage as ablation occurs during repeated use (leading to greater distance across the gap 350). That is, ablation would simply result in movement of the next arc downward within the gap 350, with only small changes in the breakdown voltage due to the small difference in distance. Other embodiments may have a larger difference in distance between the narrowest portion at the top of the arc surface 310 and the wider portion at the bottom of the arc surface.

Additionally, on a side of the electrode opposite the arc surface 310, a rounded, narrowed portion 320 is optionally formed. If included, the narrowed portion 320 may be positioned to extend from a location closer to the base portion 302 than the arc surface 310 and forms a rounded opposite surface in the area of the arc surface 310. In such embodiments, a narrowest portion of the electrode 300 (other than at the electrode tip 306) is formed at the deepest location of the narrowed portion 320, which is at a location opposing the arc surface 310. In particular, in the example shown in FIG. 10 the narrowest portion formed between the arc surface 310 and the narrowed portion 320 is located below the top of the arc surface 310. Accordingly, a cross-sectional area of the electrode in the gap forming portion 304 is at a minimum at a location at or "below" (toward the base portion 302) the uppermost edge of the arc surface 310 (where an arc would be expected to form). The cross sectional area of the electrode therefore decreases from the point at which the narrowed portion 320 begins (nearest the base portion 302) until it reaches a minimum at some location opposite the arc surface 310, but the cross-sectional area increases from that smallest/narrowest point to the point at which the arc surface 310 joins to the angled surface 307. In some embodiments the narrowed portion may stay narrowed all the way through to the electrode tip 306.

In some embodiments, other than the arc surface 310, each of the surfaces (e.g., angled surface 307, narrowed portion 320) that are machined from stock material may be machined to be relatively smooth and rounded to avoid heat buildup in the event of high current passing through the electrode; angled or rough surfaces may increase the likelihood of resistance at the surface, causing greater heat generation. In some embodiments the arc surface 310 may also be smoothed and rounded as well.

Although in preferred embodiments the electrode is constructed from a single piece of stock material (e.g., cylindrical stock), in alternative embodiments, the electrode may be cast as a single piece in the desired shape. In still further embodiments, the electrode may be cast in a predetermined shape and then machined to a desired shape.

In addition, in some embodiments, the electrodes 300 can be constructed from a combination of conductive materials including a first material (e.g., tungsten) having a relatively high melting point and a second material (e.g., copper or niobium) having a comparatively lower melting point. In this case, during repeated use of the electrodes 300 (e.g., in the case of overvoltage events), the lower melting point material may ablate faster than the higher melting point material. This has been observed to have the effect of forming a rough surface at the gap forming portion 304, with microscopic points remaining that are made from the higher melting point material. Although the overall distance between the electrodes may change in response to ablation, the rougher surface that results from that ablation makes it a comparatively easier to form a spark at the same location. Accordingly, despite a slight change in overall gap distance, the breakdown voltage between the adjacent electrodes does not increase.

In use, the electrode geometry is intended to provide improvements in overall electrical response, while also providing simpler and stronger construction. Details regarding the geometry of the electrodes 300 of FIGS. 12-17, and variants thereof, are described in connection with FIGS. 18-20 which illustrate structure and electrical response of electrodes that may be used in a manner consistent with the present disclosure.

Figure 18:
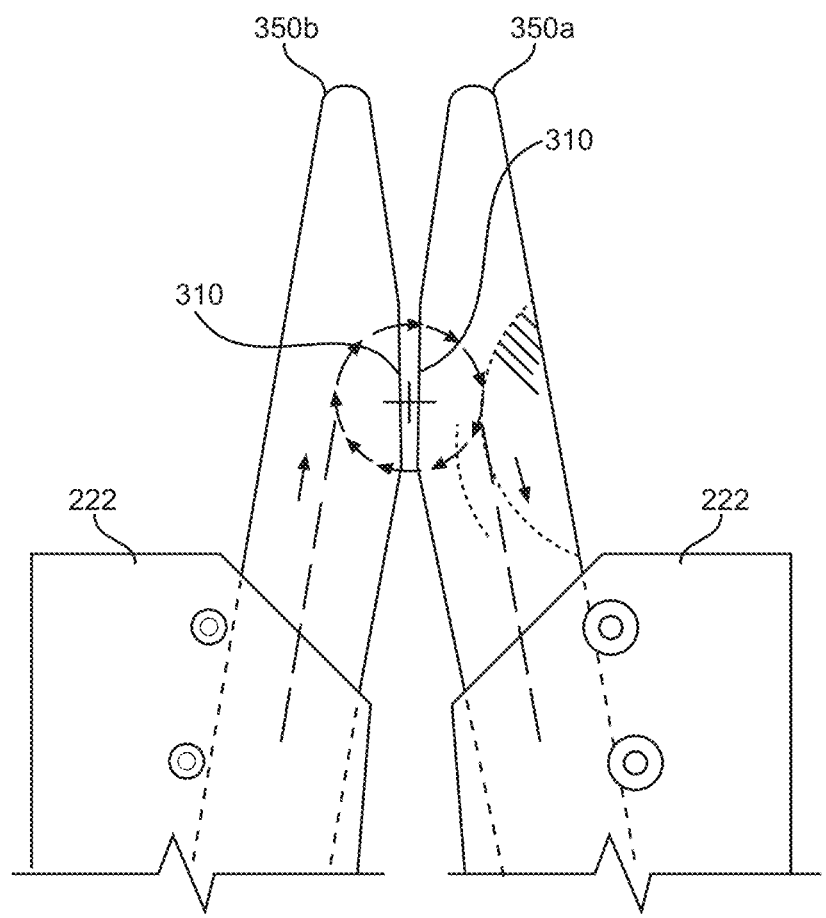
FIG. 18 is a close-up, front plan view of a portion of an overvoltage protection subassembly illustrating a geometry of adjacent electrodes, in an alternative example embodiment to that shown in FIG. 10, illustrating current flow through the electrodes upon occurrence of an overvoltage event.
Figure 19:
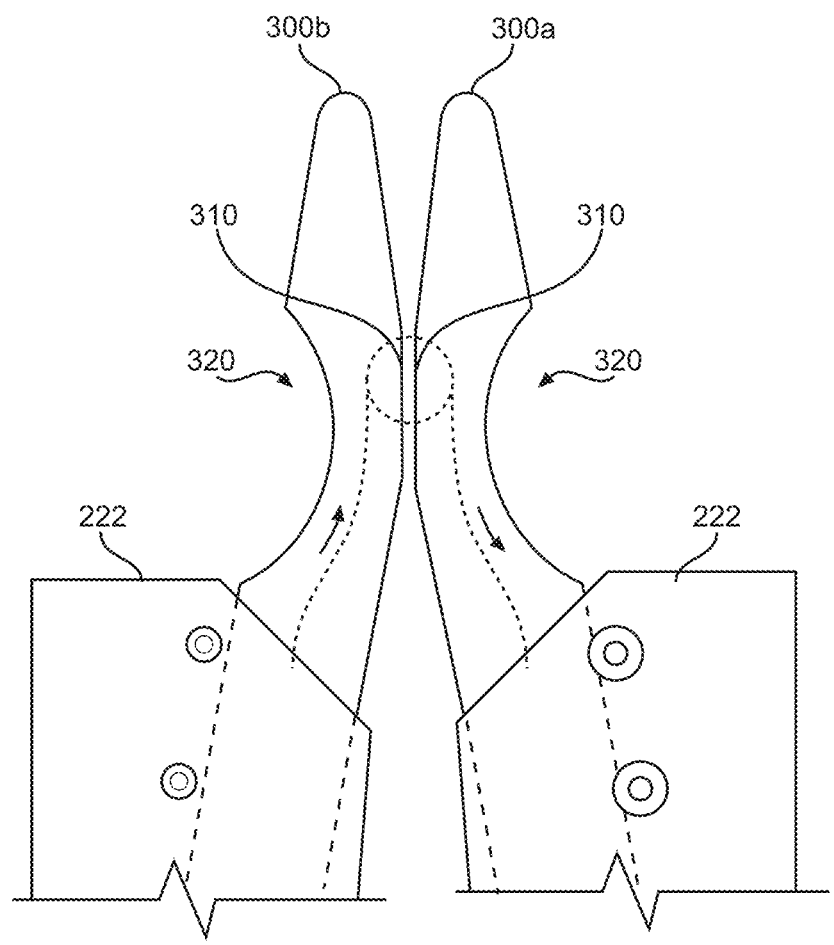
FIG. 19 is a close-up, front plan view of the portion of the overvoltage protection assembly seen in FIG. 11, illustrating current flow through the electrodes upon occurrence of an overvoltage event.
Figure 20:
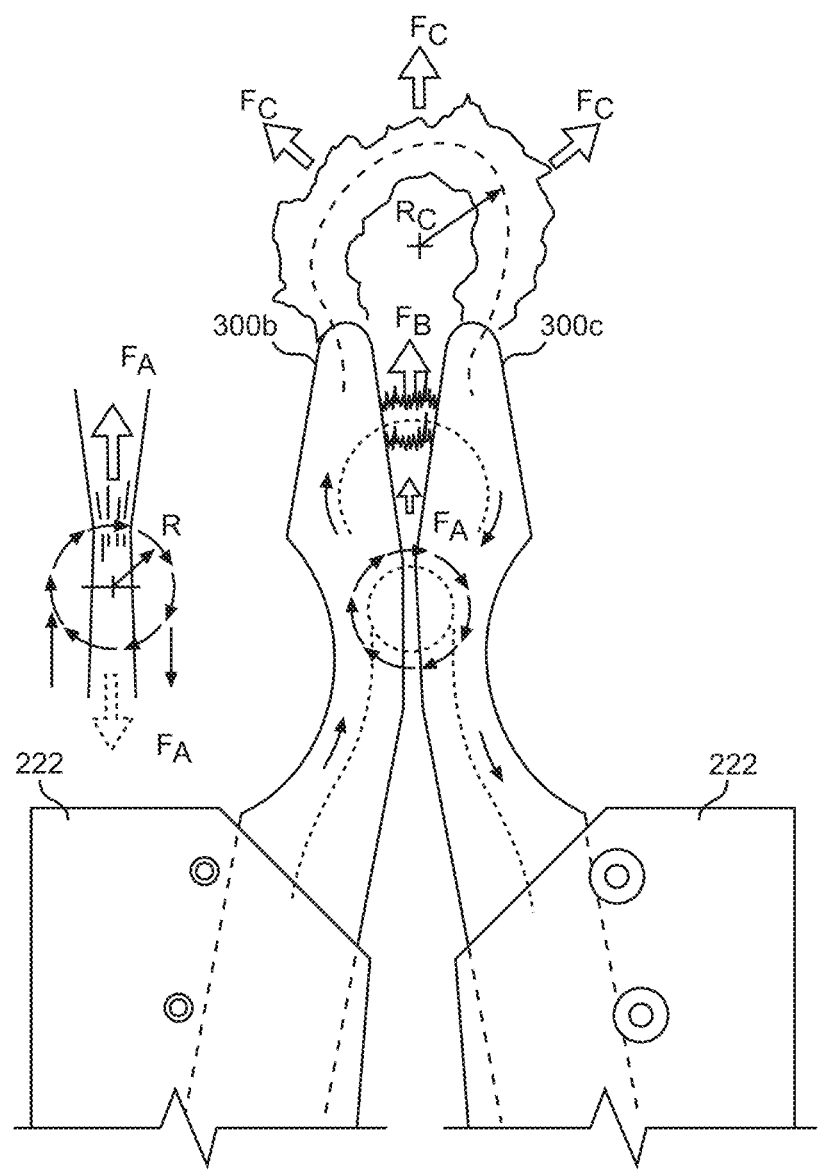
FIG. 20 is a further view of the portion of the overvoltage protection subassembly of FIG. 19 illustrating expected operation of the overvoltage protection subassembly in the case of an overvoltage event.

Generally, and referring to FIGS. 18-20, regarding the electrical response, it is noted that when a high voltage, high current event occurs (typically in the kilovolt, kiloamp range) an arc will form across the electrodes, causing current to flow "up" one electrode, across the gap, and "down" the other electrode (e.g. between a transformer neutral and a ground, as illustrated in FIGS. 1-2). In this instance, a first Lorentz force component will encourage the electrodes away from each other, since they are adjacent, parallel conductors having current running in opposite directions. Accordingly, the overvoltage protection device 100, and subassemblies 200 in particular, are constructed to withstand this force (as described above). A second Lorentz force component is provided due to the angled nature of the conductors, and at least in part due to a distance from a virtual conductor, in which the distance is defined by a radius of curvature of the arc current path when formed across the electrodes. This second Lorentz force component encourages the arc toward the tips of the electrodes, and out of the gap 350.

In embodiments where included, the narrowed portions 320 of the conductors have the function of concentrating current passing through the electrodes 300 into a comparatively smaller area, which can increase the first Lorentz force component in that region by reducing the average distance between current carried on the surfaces of the electrodes (e.g., because the center axes of the cross-sections of electrodes 300 at the narrowed portion are nearer each other than they would be absent the narrowing) while maintaining the same desired gap distance and breakdown voltage. The narrowed portions 320 also have the effect of narrowing the diameter of the virtual circle forming the second Lorentz force component; accordingly, the virtual conductor that opposes the arc current appears closer to the arc, and therefore the arc experiences a greater Lorentz force encouraging the arc out of the gap and toward the electrode tips 308. That is, the objective of both angling and narrowing the electrode specifically at or below the gap where the arc forms is to have the centerline of the cross-sectional area closer to the opposing electrode. This creates a smaller radius on the virtual circle and enhances the Lorentz force on the arc.

In alternative embodiments of the electrode 300, the arc surface 310 may be excluded. In such embodiments, the narrowed portion 320 will be formed to have a narrowest area (smallest cross-sectional area) nearer to the base portion 302, and gradually widening to a point where the angled surface 307 begins, leading to electrode tips 308. In further alternative embodiments of an electrode (such as seen in FIG. 18, below) the narrowed portion 320 may be excluded. In such embodiments, the arc surface 310 and angled surfaces may remain, extending toward the electrode tip 306. Such an arrangement may provide the advantages of one-piece construction and may be suitable for use across some or all of the operational voltage/current range of the electrode 300.

In still further alternative embodiments, the electrode 300 may not be entirely round in cross-sectional shape. In such embodiments, the electrode may be cylindrical, but may be constructed from material having an oval, ovoid, or elliptical cross-sectional shape. In other examples, the electrode 300 may even have a rectangular shape with smoothed edges. The general goal, in preferred embodiments, is to avoid sharp edges. The electrode made further be made from curved (rather than straight) stock material, e.g., having a gradually bent shape, rather than a linear shape. Other geometries for the stock material from which the electrode can be constructed are possible as well.

It is noted that the Lorentz force component that encourages the arc to rise toward the electrode tips 306 may be managed via the overall geometry of an electrode. This is expected because a virtual opposed conductor is provided by the circuit loop. The magnitude of this second Lorentz force component has a function that is based on forces on opposite sides of a virtual conductor pair having a virtual distance defined by a diameter of a virtual circle formed by the current passing across the gap. FIGS. 18-20 illustrate variations of possible electrodes that may be constructed in a manner consistent with the present disclosure, but which vary the geometry of the electrode to vary the electrical response (and therefore the Lorentz force) that may be experienced based on a given overvoltage event.

FIG. 18 depicts the path of current flow and the creation of a virtual circle that represents the overall "vertical" Lorentz force that is generated at an electrode pair formed according to a possible alternative electrode construction contemplated herein. As noted above, in this example, the electrode (designated as electrode 350) is constructed generally in accordance with the electrode 300 noted above, but lacks the narrowed portion(s) 320.

In the example shown, a virtual circle is depicted in a gap forming portion. In the orientation depicted, a top of the virtual circle corresponds to a location at which a spark is formed. The bottom of the virtual circle is defined by a radius of the circle, which is in turn defined by the radius of the current path. In this example, because the average current path is through the center of each electrode, the virtual circle has a radius formed by a distance between a centerline between the electrodes in the gap forming region and a center of the electrode at a location offset "downward" from the spark formation location by that same radius (seen as center location in FIG. 18). The virtual circle has a diameter as shown, and the magnitude of the Lorentz force acting upwardly on the electrical spark will be inversely proportional to the distance between two virtual conductors, in this case, the distance between the spark location and the lower opposed portion of the virtual circle.

FIG. 19 illustrates a path of current flow and creation of a virtual circle that represents the overall "vertical" Lorentz force component that is generated at an electrode pair formed using electrodes 300, as discussed above. In this example, the "upward" component of Lorentz force is determined similarly—i.e., by the distance between a center axis extending between two electrodes and a centroid of the cross-sectional area of each electrode itself, offset downward from the arc forming location by the same radius. In this example, because of narrowed portions 320, the centroid of the cross-sectional area of each electrode is closer to the central axis, and therefore, the virtual circle is relatively smaller. The relatively smaller virtual circle results in the virtual conductors formed by the spark location and the lower opposed portion of the virtual circle being significantly closer together. This results in a proportionally higher "vertical", or second component of the Lorentz force, which will therefore more forcefully urge the spark away from the gap forming region of the respective electrodes, toward the electrode tip 306. This should enhance the force and speed at which an electrical arc moves out of the spark gap region, and therefore preserves the faces of the electrodes 300 at the location where the initial arc is formed.

FIG. 20 shows progress of an electrical arc toward the electrode tips 306 of opposed electrodes 300, in a simulated example. When the arc reaches the electrode tips 306, that electrical arc is still expanding until (1) the current drops, (2) some obstacle is encountered, or (3) the loop formed by the arc becomes unstable and there is a break in the continuous loop of plasma. In this instance, the conductor (plasma) breaks apart and a new arc may form if the overvoltage condition remains, perhaps at position A (the original arc forming location) shown in FIG. 19.

Figure 21:
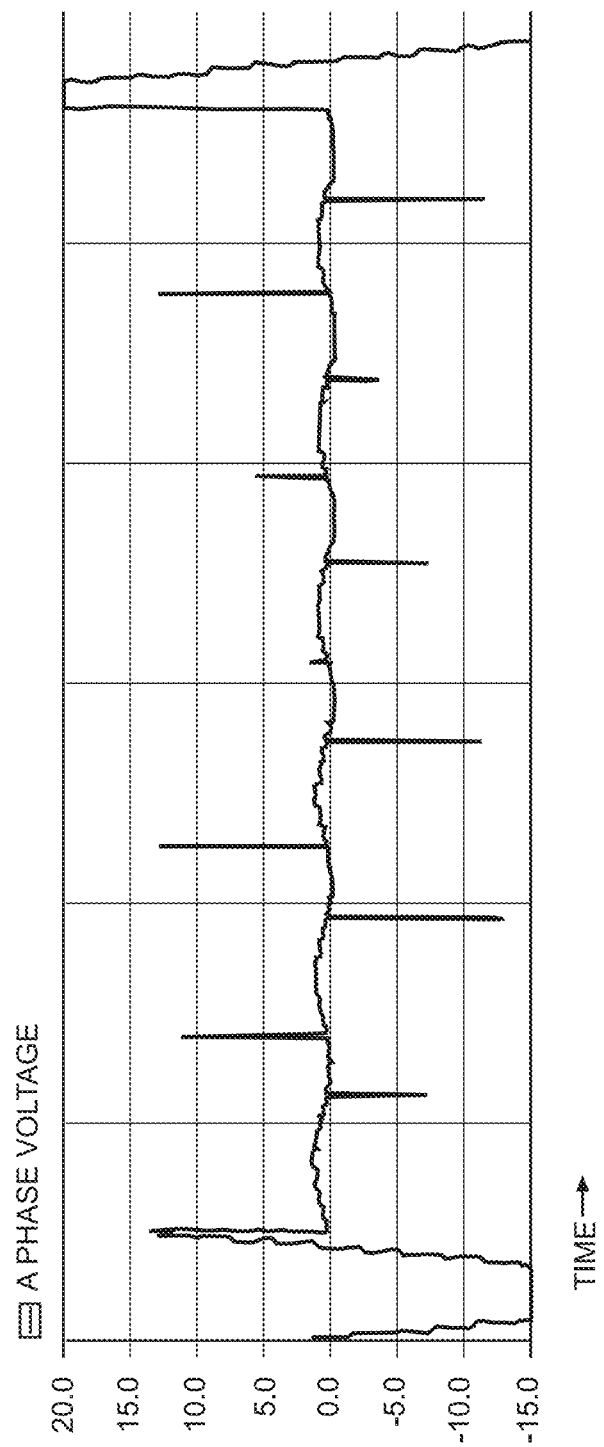
FIG. 21 is a voltage waveform illustrating typical voltages experienced at a transformer neutral lacking an overvoltage protection device such as described herein.
Figure 22:
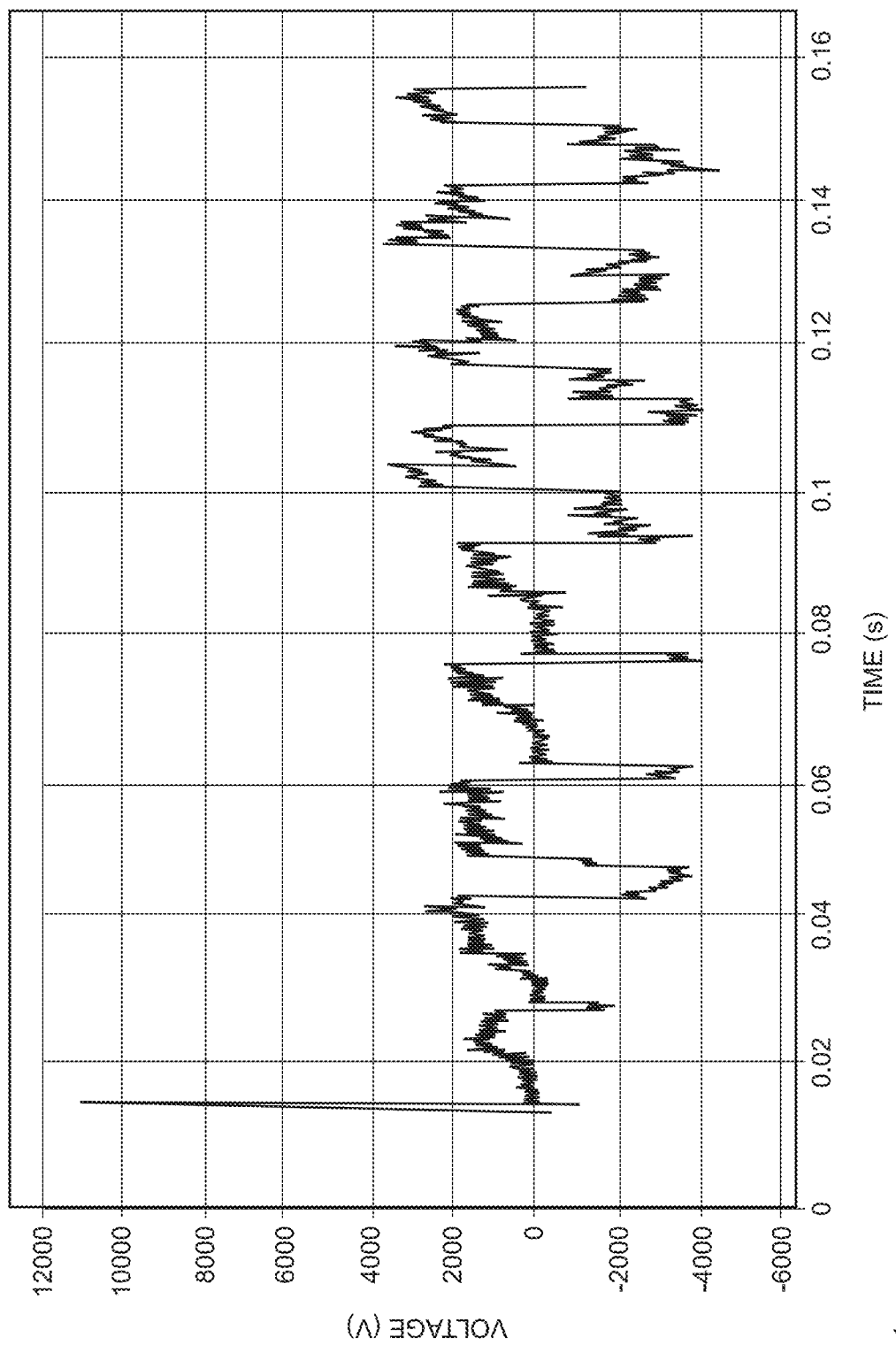
FIG. 22 is a voltage waveform illustrating typical voltages experienced at the transformer neutral having a certain existing overvoltage protection device electrically connected between the transformer neutral and ground.
Figure 23:
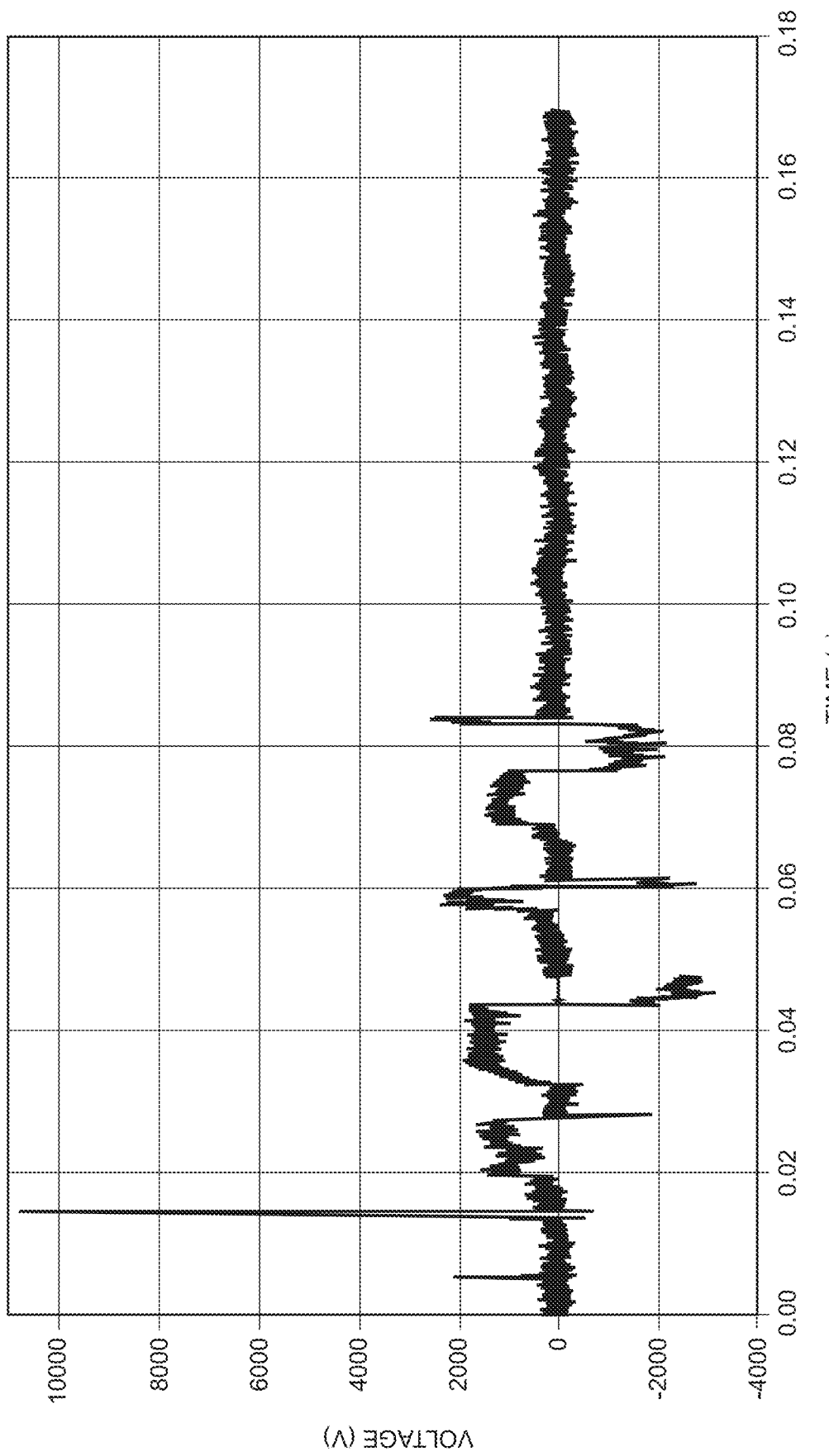
FIG. 23 is a voltage waveform illustrating expected voltages at the transformer neutral having an overvoltage protection device constructed in a manner consistent with the present disclosure is provided between the transformer neutral and the ground.

Referring now to FIGS. 21-23, example voltage waveforms are shown that illustrate voltage spiking at a transformer neutral and effects of an overvoltage protection device, according to various embodiments.

In general, an overvoltage protection device as contemplated herein will have a particular "set point" as noted above; this set point corresponds to a voltage at which an electrical arc may form between the electrodes of a particular subassembly. A relatively low set point requires a relatively small air gap between the electrodes (since the set point voltage is in a roughly linear relationship to the distance between the electrodes). Because the gap is very small at low voltage set points, the tolerances are more important to maintain an acceptable percentage of drift over repeated operation of the overvoltage protection device.

However, the device also experiences significant current, which affects operation of the device in response to repeated overvoltage events. In general, the higher an amperage passing between a pair of electrodes, the greater the energy dissipated in the arc formed, and the more surface damage to the electrodes that may occur.

In accordance with the present disclosure, an overvoltage protection device is provided that meets a particularized set of criteria—namely, the ability to accommodate a very large current, with a very low set point that remains stable over repeated occurrences. For example, if the set point is to be 5 kV, the air gap would be approximately 0.05 inches. With a high amperage and one type of metal electrode, the surface damage in a first action may make each electrode just 0.005" rougher, thus increasing the gap by 0.01 inches. This would raise the set point by approximately 20% (0.01/0.05) for the second arc dissipation action between the electrodes, and over 40% for the third action. In a second example with a ten times higher 50 kV set point and a corresponding air gap of 0.5 inches, the same amperage and with electrodes formed from the same material, the gap may increase by the same 0.01 inches, but this will raise the set point only 2% (0.01/0.50) for the next arc dissipation action, 4% for a third action and so on. Accordingly, only small, incremental change in the set point may occur at higher voltage levels. Thus it is far more difficult to make a spark gap which maintains the set point adequately and predictably when the current (and consequent damage to electrode faces) is high and the set point is low (requiring a very small gap where damage effects are much larger in proportion to the gap.)

Of course there are other factors which have an effect on the breakdown voltage, as discussed above. One is the robustness and structural integrity of the electrodes and their supports so as to maintain the accurate gap. Another is the effect of the shape of the surfaces of electrodes, which may be selected to minimize changes in gap due to material damage as described above. A third is selection of an appropriate alloy to control erosion and counteract that erosion of material. A fourth is to coordinate the electrode geometry and shape to maximize the electromagnetic Lorentz force on the arc formed between electrodes, thereby directing that force in one direction reliably to push the arc away from the narrow point of initiation between electrodes as quickly as possible.

As stated, if the arc lingers at any one point it will quickly damage the electrode surface—even using the best material available—and cause the spark gap to drift too quickly out of reasonable specified set point with repeated protective actions. Accordingly, the coordination of above factors allows the design of the spark gap assembly and electrodes described herein to perform acceptably in the "high amperes and low set point voltages" range required for a large number of protective devices in the power grid. The ranges of acceptable currents initially contemplated are from near zero up to perhaps 168 kA (peak). This depends in part on the strength of a lightning strike or fault current, the severity of a nuclear EMP or large solar flare induced current in the system, or the durability of a connection made by two conductors at different voltages which are mistakenly brought into contact by any accident or error. The ranges for the set point initially contemplated are from perhaps 2 kV and up to 25 kV. Ranges below about 2 kV may also be possible, depending on current levels and acceptable gap tolerances, as well as additional techniques for reducing the drift of set point at each protective action. The upper range for the set point can have two initial limits: first, many power grid components are limited to less than 30,000 volts or 30 kV at the transformer insulators—the overvoltage protection device described herein should be configured to form an arc at a set point below that voltage to protect the large and expensive transformer. Second, as a practical matter it is easier to make a crude spark gap which is fairly stable in set point when the gap is quite large to begin with; accordingly, the upper limit of interest may also practically be set by a limit at which slight changes in gap distance due to ablation of material will not materially affect the set point (e.g., over about 100 kV or higher).

Accordingly, applications of this spark gap design as shown may be tailored in geometry and electrode design to perform from a minimum to a maximum amperage and minimum to a maximum voltage specified within the maximum ranges of 1 kA to 168 kA (peak) and from 2 kV to 100 kV and for up to a minimum number of repeated protective actions before exceeding acceptable tolerances on the set point drift higher or lower. It is generally expected that the overvoltage assemblies described herein will experience less than 15% drift (lower, not higher) off initial specification in 20 actions, considering the particular parallel arrangement of subassemblies described herein. In some examples, coordination of these general factors has been proven in tests to allow repeated arcs of up to and exceeding 20 kA, and 2-10 kV or higher with only about 10% drift in set point and no increase in breakdown voltage.

Still further, by way of coordination of at least the design features described herein (robust structure, shape and angles approaching the narrow point of initial arc, shape of the electrodes to enhance or 'pinch' magnetic forces, and material selected to counteract the increasing gap with each protective action) a simple, robust, low-maintenance spark gap may be provided using paired electrodes without requiring inclusion of complex triggers, electronics, electrical apparatus, and related power supplies and/or even much more complex collections of solid state devices. Given typical applications may include positioning such an overvoltage protection device at remote transformer and substation locations without continual inspection and verification, which are immediately responsive and adequately limit voltage by diverting large amounts of current as needed over a range of possible conditions.

By way of illustration, FIG. 21 illustrates a voltage waveform 400 that depicts typical voltages experienced at a transformer lacking an overvoltage protection device such as described herein. In this example, even after protection is applied at a transformer neutral upon experiencing a voltage spike above 10 kV (seen early in time), subsequent overvoltage events above 10 kV may continue to occur (with opposite polarity) on zero-crossings for each phase of the transformer.

To address this spike at zero-crossings caused by voltage imbalances among the phases that occurs due to direct current at the transformer neutral, a protection circuit such as those described above in connection with FIGS. 1-2 may be utilized. In that context, in the event of an overvoltage event having a comparatively high magnitude (e.g., over 1-3 kV, typically in the range of 4 kV to 10 kV or more, an overvoltage protection assembly 100 may be used to protect the electrical circuit with which it is associated. In FIG. 22, a waveform 500 is shown illustrating a voltage response at the transformer neutral of an overvoltage protection device constructed in accordance with example aspects of the present disclosure. That arrangement illustrates that although the initial 10 kV event is experienced, subsequent events at the transformer neutral during subsequent power line cycles are significantly below a threshold of possible damage to the corresponding electrical protection circuit. In this example, the subsequent voltages experienced at the following power line cycles are simulated to be approximately −0.2 kV, 2 kV, −2 kV, 2.5 kV, −4 kV, 2 kV, etc. This performance is preferable to the waveform seen in FIG. 21, since it results in less total voltage on the transformer neutral. This results in significantly less stress on the construction of the transformer, since there are far fewer sudden voltage drops (e.g., 10 kV to zero within moments, essentially).

FIG. 23 is further simulated voltage waveform 600 illustrating expected voltages at the transformer neutral having an overvoltage protection device 100 constructed in a manner consistent with the present disclosure provided between the transformer neutral and the ground. In this arrangement, only slight spikes during a few (in this case, eight) subsequent cycles are experienced (in the range of +/−2 kV). It is speculated that the current construction of the overvoltage protection device 100 maintains iodized air in the region between the electrodes 300, and maintains the spark on the tips of the electrodes. Accordingly, because the arc remains over a few power line cycles, the voltage remains low between the transformer neutral and ground over a series of power line cycles, and resulting in fewer sparking events at the narrowest gap forming region of the electrodes 300. Ideally, only a single spark will form across the arc surface 310 for each overvoltage event, irrespective of duration. This is expected to result in comparatively increased ablation of the electrode tips and reduction of ablation of the arc surface 310, thereby improving the robustness of the overvoltage protection assembly 100 overall, and improving reliability.

It is noted that, in accordance with various embodiments of the present disclosure, additional features may be incorporated in the design as well. For example, a protective enclosure may be positioned around the overvoltage protection assembly 100 to contain any ionized gas, which may further encourage any initial arc to be maintained on the electrode tips. Additionally, a specific geometry, (e.g., length and angle of divergence) of the electrodes in the region of the tip 308 may be applied to better maintain the electrical arc once formed.

Overall, and referring to FIGS. 1-23 generally, formation of each electrode from a single element has a number of advantages, both with respect to manufacturability and with respect to strength. For example, as compared to the electrode structure described in U.S. Pat. No. 9,660,441, if such angled electrodes were made from non-bendable material, the electrodes must be welded or otherwise joined together in a way that ensures continuous joinder of adjacent segments. The electrode structures described herein, which may be manufactured from a single cylindrical component, provide reliable strength because such welding or other joining process is unnecessary.

Still further, the electrodes described herein adopt a geometry that encourages improved response in the event of overvoltage events. Specifically, the geometry of the electrodes encourages any spark which forms at a narrowest gap between facing portions of the electrodes to quickly be encouraged to move away from that gap and toward the electrode tips. This encouragement is driven, at least in part, by the geometry of the electrodes at and just "below" (away from the electrode tips) the narrowest portion of the electrode gap. As such, because a spark will typically remain for a plurality of power lines cycles at 50-60 Hz, most melting and/or ablation of the electrodes will occur at or near the electrode tips. Therefore, melting or ablation of the electrodes at the narrowest gap is minimized, and the breakdown voltage is maintained because the distance between the electrodes remains approximately constant for a greater number of overvoltage events.

Although the overvoltage protection assembly 100 (and related subassemblies 200, 250 and electrodes 300, 350) are described herein, it is recognized herein that a variety of other types of circuit arrangements may be used as well. Example circuit arrangements utilizing an overvoltage protection device, and which may use the overvoltage protection device 100 described herein, are provided in U.S. Pat. No. 9,077,172, entitled "Self-Testing Features of Sensing and Control Electronics for a Power Grid Protection System", as well as U.S. Pat. No. 10,199,821, entitled "Systems and Methods for Actuating a Transformer Neutral Blocking System", the disclosures of each of which are hereby incorporated by reference in their entireties. In such contexts, the overvoltage protection device 100 may be useable in conjunction with switched arrangements to protect against damage to power line transformers and associated circuitry, including DC blocking components that are electrically connected between a neutral of such a transformer and a ground.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

We claim:

1. An overvoltage protection assembly comprising:
   at least one overvoltage subassembly including:
   a first electrode, and a second electrode positioned opposed to the first electrode, the first electrode comprising a unitary conductive element and including:
      a base portion at a first end;
      an electrode tip portion at a second end opposite the base portion, the electrode tip portion having an angled surface formed in the unitary conductive element; and
      a gap forming portion between the base portion and the electrode tip portion, the gap forming portion having an arc surface formed into a side of the unitary conductive element and an arc forming location at an end of the arc surface adjacent the angled surface;
   wherein:
      the arc surface of the first electrode is oriented toward the second electrode; and
      a cross-sectional area of the first electrode in the gap forming portion is smaller than a cross-sectional area of the first electrode located in the base portion.

2. The overvoltage protection assembly of claim 1, wherein the second electrode comprises a unitary conductive element including:
   a base portion at a first end;
   an electrode tip portion at a second end opposite the base portion, the electrode tip portion having an angled surface formed in the unitary conductive element; and
   a gap forming portion between the base portion and the electrode tip portion, the gap forming portion having an arc surface formed into a side of the unitary conductive element and an arc forming location at an end of the arc surface adjacent the angled surface;
   wherein:
      the arc surface of the second electrode is oriented toward the first electrode; and
      a cross-sectional area of the second electrode in the gap forming portion is smaller than a cross-sectional area of the second electrode located in the base portion.

3. The overvoltage protection assembly of claim 2, wherein each of the first electrode and the second electrode further include a narrowed region positioned at least partially within the gap forming portion and on an opposite side of the unitary conductive element from the arc surface.

4. The overvoltage protection assembly of claim 3, wherein a cross-sectional area of the first electrode in the gap forming portion is smaller than a cross-sectional area in at least one location within the electrode tip portion.

5. The overvoltage protection assembly of claim 2, wherein the angled surface of the first electrode diverges from the angled surface of the second electrode as the first and second electrodes extend away from the gap forming portion toward the electrode tip.

6. The overvoltage protection assembly of claim 5, wherein the angled surface of the first electrode and the angled surface of the second electrode form an angle of less than 90 degrees.

7. The overvoltage protection assembly of claim 1, wherein the first electrode is constructed from a mix of materials including a first conductive material having a first melting point and a second conductive material having a second melting point, and
   wherein, upon an electrical spark extending between the first electrode and the second electrode, a roughened surface forms on at least a portion of the arc forming location of the first electrode, thereby reducing a breakdown voltage between the first electrode and the second electrode.

8. The overvoltage protection assembly of claim 1, wherein the first electrode and the second electrode are mounted within the overvoltage subassembly via first and second support blocks, respectively, the first electrode and second electrode being mountable at an adjustable distance away from each other.

9. The overvoltage protection assembly of claim 1, wherein the arc surface of the first electrode extends linearly between the base portion and the electrode tip portion.

10. An electrode comprising a cylindrical conductive element constructed from a first conductive material having a first melting point and a second conductive material having a second melting point, the electrode including:
    a base portion at a first end of the electrode;
    an electrode tip portion at a second end of the electrode opposite the base portion, the electrode tip portion having an angled surface;
    a gap forming portion between the base portion and the electrode tip portion, the gap forming portion having an arc surface formed into a side of the cylindrical conductive element and an arc forming location at an end of the arc surface adjacent the angled surface; and
    a narrowed region positioned at least partially within the gap forming portion and on an opposite side of the cylindrical conductive element;
    wherein a smallest cross-sectional area of the electrode in the gap forming portion is formed at a location along the narrowed region and between the base portion and the arc forming location.

11. The electrode of claim 10, wherein the angled surface is formed in the cylindrical conductive element by removal of conductive material.

12. The electrode of claim 10, wherein the narrowed region comprises a curved region.

13. The electrode of claim 12, wherein the curved region is machined from the cylindrical conductive element.

14. The electrode of claim 10, wherein the first conductive material comprises tungsten.

15. The electrode of claim 14, wherein the second conductive material comprises copper.

16. The electrode of claim 10, wherein the cylindrical conductive element extends in a curved axial direction.

17. An overvoltage protection assembly comprising:
at least one overvoltage subassembly including:
a first frame portion and an opposed second frame portion;
one or more insulators mounted between the first frame portion and the opposed second frame portion;
a first support mount mounted to the first frame portion and a second support mount mounted to the second frame portion;
a pair of opposed electrodes including a first electrode mounted in the first support mount and a second electrode mounted in the second support mount;
wherein the first electrode extends from the first support mount and the second electrode extends from the second support mount to approach each other at an incident angle, arriving at a gap, and
wherein the first electrode and the second electrode each have electrode tips diverging from the gap at a second angle, and are each constructed from a unitary conductive element; and
wherein the first electrode has a narrowed region positioned on an opposite side from the gap, wherein a cross-sectional area of the first electrode at a location within the narrowed region is smaller than a cross-sectional area in a base portion of the first electrode mounted to the first support mount.

18. The overvoltage protection assembly of claim 17, wherein the second electrode has a narrowed region positioned on an opposite side from the gap, wherein a cross-sectional area of the second electrode at a location within the narrowed region is smaller than a cross-sectional area in a base portion of the second electrode mounted to the second support mount.

19. The overvoltage protection assembly of claim 17, wherein the unitary conductive element used to construct the first electrode comprises a cylindrical conductive element.

20. The overvoltage protection assembly of claim 19, wherein the first electrode has a circular cross-sectional area approximately equal to that of the cylindrical conductive element.

21. The overvoltage protection assembly of claim 17, wherein the at least one overvoltage subassembly includes a plurality of overvoltage subassemblies in parallel with each other.

* * * * *